United States Patent
Hara et al.

(10) Patent No.: US 11,426,690 B2
(45) Date of Patent: Aug. 30, 2022

(54) AIR FILTER MEDIUM

(71) Applicant: DAIKIN INDUSTRIES, LTD., Osaka (JP)

(72) Inventors: Satoshi Hara, Osaka (JP); Kunihiko Inui, Osaka (JP); Tatsumi Sakano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 538 days.

(21) Appl. No.: 16/477,270

(22) PCT Filed: Jan. 9, 2018

(86) PCT No.: PCT/JP2018/000206
§ 371 (c)(1),
(2) Date: Jul. 11, 2019

(87) PCT Pub. No.: WO2018/131573
PCT Pub. Date: Jul. 19, 2018

(65) Prior Publication Data
US 2020/0030734 A1    Jan. 30, 2020

(30) Foreign Application Priority Data
Jan. 12, 2017 (JP) .............................. JP2017-003678

(51) Int. Cl.
*B01D 46/10* (2006.01)

(52) U.S. Cl.
CPC ........ *B01D 46/10* (2013.01); *B01D 2257/204* (2013.01)

(58) Field of Classification Search
CPC .............. B01D 46/10; B01D 39/1623; B01D 2257/204; B01D 2239/025;
(Continued)

(56) References Cited

U.S. PATENT DOCUMENTS 7,858,163 B2 * 12/2010 Angadjivand ........... D04H 3/14
428/36.1
2009/0139405 A1    6/2009 Schwarz et al.
(Continued)

FOREIGN PATENT DOCUMENTS

EP          2752230 A1    7/2014
JP       2001-170424 A    6/2001
(Continued)

OTHER PUBLICATIONS

International Search Report, issued in PCT/JP2018/000206, PCT/ISA/210, dated Apr. 10, 2018.
Extended European Search Report, dated Sep. 18, 2020, for European Application No. 18739248.5.

*Primary Examiner* — Minh Chau T Pham
(74) *Attorney, Agent, or Firm* — Birch, Stewart, Kolasch & Birch, LLP

(57) ABSTRACT

An air filter medium reduces a decrease in collection efficiency in the case where a main collection layer and a pre-collection layer having a lower collection efficiency than the main collection layer are used. An air filter medium that collects dust in gas includes a main collection layer and a pre-collection layer that has a lower collection efficiency of NaCl particles having a particle size of 0.3 μm than the main collection layer, is disposed on an upstream side of an air flow with respect to the main collection layer, and has water repellency.

15 Claims, 4 Drawing Sheets

(58) Field of Classification Search
CPC ...... B01D 2239/065; B01D 2239/0428; B01D 2239/1233
USPC ............... 55/486, 522; 95/287; 128/863; 428/36.1
See application file for complete search history.

(56) References Cited

U.S. PATENT DOCUMENTS

| | | |
|---|---|---|
| 2010/0269464 A1 | 10/2010 | Mori et al. |
| 2011/0214570 A1* | 9/2011 | Jones ................ B01D 39/1623 95/287 |
| 2013/0097982 A1 | 4/2013 | Inui et al. |
| 2014/0190492 A1* | 7/2014 | Noh ................... A41D 13/1161 128/863 |

FOREIGN PATENT DOCUMENTS

| | | |
|---|---|---|
| JP | 2005-205305 A | 8/2005 |
| JP | 2006-289174 A | 10/2006 |
| JP | 2007-144415 A | 6/2007 |
| JP | 2009-501438 A | 1/2009 |
| JP | 2012-20274 A | 2/2012 |
| JP | 2013-505122 A | 2/2013 |
| JP | 2013-94717 A | 5/2013 |
| JP | 2014-30825 A | 2/2014 |
| JP | 2018-51544 A | 4/2018 |
| WO | WO 2016/104589 A1 | 6/2016 |

\* cited by examiner

AIR FILTER MEDIUM

TECHNICAL FIELD

The present invention relates to an air filter medium.

BACKGROUND ART

Air filters are classified into, for example, ULPA (ultra low penetration air) filters, HEPA (high efficiency particulate air) filters, and medium efficiency particulate air filters in accordance with the collection efficiency of particles having a particular particle size. Such air filters are used in various applications in accordance with their performance.

Such an air filter has been desired to have a long life by reducing an increase in pressure loss. For example, it is proposed in an air filter medium disclosed in PTL 1 (Japanese Laid-Open Patent Publication No. 2013-094717) that a prefilter layer capable of collecting larger dust is disposed on the upstream side of a polytetrafluoroethylene porous film to suppress clogging caused when large dust reaches the porous film, thereby achieving a long life.

SUMMARY OF THE INVENTION

Technical Problem

It is proposed in the air filter medium disclosed in PTL 1 that a long life is achieved by disposing a prefilter on an upstream side of the porous film. However, as a result of studies, the present inventors have found that when an air filter including a prefilter is used in a high-humidity environment such as a rainy environment or in an environment in which water droplets adhere, dust collected in the prefilter first is wetted and thus aggregated and grown to form a flowable aggregate.

If dust becomes flowable and grows to a large size, the dust whose particle size has been increased in the prefilter is susceptible to air flow resistance and tends to flow to the downstream side from the position at which the dust is collected in the prefilter first. If dust having a relatively large size in the prefilter flows to the downstream side, the dust having a relatively large size reaches the porous film relatively early after the air filter starts to be used. The flowable dust that has reached the porous film covers fibers of the porous film to increase the size of the fibers. Thus, the collection efficiency of the air filter sometimes decreases relatively early.

In view of the foregoing, it is an object of the present invention to provide an air filter medium capable of reducing a decrease in collection efficiency in the case where a main collection layer and a pre-collection layer having a lower collection efficiency than the main collection layer are used.

Solution to Problem

As a result of thorough studies to achieve the above object, the present inventors have found that the aggregation and growth of particles can be suppressed even in a wet environment by imparting water repellency to a pre-collection layer, which can make it difficult for the particles to reach a main collection layer on the downstream side. Thus, they have completed the present invention.

An air filter medium according to a first aspect is an air filter medium that collects dust in gas and includes a main collection layer and a pre-collection layer. When air containing NaCl particles having a particle size of 0.3 μm is passed at a flow velocity of 5.3 cm/s, the pre-collection layer has a lower collection efficiency of the particles than the main collection layer. The pre-collection layer is disposed on an upstream side of an air flow with respect to the main collection layer. The pre-collection layer has water repellency.

The main collection layer is not necessarily constituted by a single film and may be constituted by a plurality of films stacked on top of each other.

In this air filter medium, the pre-collection layer having a lower collection efficiency than the main collection layer is disposed on the upstream side of an air flow with respect to the main collection layer. Therefore, dust having a relatively large size can be collected before reaching the main collection layer, which can suppress clogging in the main collection layer. Furthermore, the pre-collection layer has water repellency. Therefore, even if water droplets adhere to the pre-collection layer, the water droplets are easily repelled without being wetted. Thus, the water droplets that have adhered to the pre-collection layer can be dried while being repelled. This can suppress wetting of dust collected in the pre-collection layer, which can suppress the aggregation and growth of particles collected in the pre-collection layer. Since the growth of particles collected in the pre-collection layer is suppressed, the particles collected in the pre-collection layer receive only a low resistance from the air flow, which can suppress the flow of the particles to the downstream side of the pre-collection layer (can delay the flow to the downstream side). This can suppress clogging of the main collection layer disposed on the downstream side of the air flow with respect to the pre-collection layer due to particles whose size is increased after collected in the pre-collection layer.

Thus, the decrease in collection efficiency in the case where the main collection layer and the pre-collection layer having a lower collection efficiency than the main collection layer are used can be reduced.

An air filter medium according to a second aspect is the air filter medium according to the first aspect, wherein the pre-collection layer has a contact angle of 90° or more, the contact angle being measured 30 seconds after a 25 vol % aqueous isopropyl alcohol solution is dropped onto the pre-collection layer.

This air filter medium can sufficiently repel water in the pre-collection layer, and thus the growth of particles collected in the pre-collection layer can be sufficiently suppressed.

An air filter medium according to a third aspect is the air filter medium according to the first aspect or the second aspect, wherein the pre-collection layer has a fluorine content of 1000 ppm or more.

This air filter medium can sufficiently repel water in the pre-collection layer, and thus the growth of particles collected in the pre-collection layer can be sufficiently suppressed.

An air filter medium according to a fourth aspect is the air filter medium according to any one of the first aspect to the third aspect, wherein when air containing NaCl particles having a particle size of 0.3 μm is passed through the pre-collection layer at a flow velocity of 5.3 cm/s, the pre-collection layer has a collection efficiency of the particles of 25% or more and 80% or less; and when air containing NaCl particles having a particle size of 0.3 μm is passed through the main collection layer at a flow velocity of 5.3 cm/s, the main collection layer has a collection efficiency of the particles of 75% or more and 99.9999% or less.

In this air filter medium, the main collection layer has a higher collection efficiency than the pre-collection layer, which requires suppression of the reaching of particles collected in the pre-collection layer to the main collection layer. In fact, the reaching of particles collected in the pre-collection layer can be suppressed.

An air filter medium according to a fifth aspect is the air filter medium according to any one of the first aspect to the fourth aspect, wherein when air containing NaCl particles having a particle size of 0.3 µm is passed through the pre-collection layer at a flow velocity of 5.3 cm/s, the pre-collection layer has a collection efficiency of the particles of 25% or more and 55% or less; and when air containing NaCl particles having a particle size of 0.3 µm is passed through the main collection layer at a flow velocity of 5.3 cm/s, the main collection layer has a collection efficiency of the particles of 75% or more and 99.9999% or less.

In this air filter medium, the main collection layer particularly has a higher collection efficiency than the pre-collection layer, which particularly requires suppression of the reaching of particles collected in the pre-collection layer to the main collection layer. In fact, the reaching of particles collected in the pre-collection layer can be suppressed.

An air filter medium according to a sixth aspect is the air filter medium according to any one of the first aspect to the fifth aspect, wherein the pre-collection layer and the main collection layer are in contact with each other in an air-flow direction.

In this air filter medium, the pre-collection layer and the main collection layer are in contact with each other in an air-flow direction and thus particles grown in the pre-collection layer readily reach the main collection layer and the collection efficiency tends to decrease. However, such a decrease in collection efficiency can be sufficiently reduced.

An air filter medium according to a seventh aspect is the air filter medium according to any one of the first aspect to the sixth aspect, wherein the pre-collection layer has an average fiber diameter of 1.0 µm or more and 4.0 µm or less.

In this air filter medium, the pre-collection layer has an average fiber diameter of 1.0 µm or more and 4.0 µm or less and thus particles collected in the pre-collection layer are easily aggregated in a wet environment. However, even if particles collected in the pre-collection layer are easily aggregated, such aggregation can be suppressed by imparting water repellency.

An air filter medium according to an eighth aspect is the air filter medium according to any one of the first aspect to the seventh aspect, wherein the main collection layer has an average fiber diameter of 0.05 µm or more and 0.3 µm or less.

In this air filter medium, the main collection layer has a small average fiber diameter and thus the suppression of the reaching of particles collected in the pre-collection layer to the main collection layer is particularly required. In fact, the reaching of particles collected in the pre-collection layer can be suppressed.

An air filter medium according to a ninth aspect is the air filter medium according to any one of the first aspect to the eighth aspect, wherein the main collection layer includes a porous film mainly containing a fluororesin.

In this air filter medium, a porous film containing a fluororesin is used in the main collection layer and thus the collection efficiency tends to noticeably decrease because of the reaching of particles grown in the pre-collection layer. However, such a decrease in collection efficiency can be sufficiently reduced.

An air filter medium according to a tenth aspect is the air filter medium according to any one of the first aspect to the ninth aspect that further includes an air-permeable supporting member disposed on a downstream side of the air flow with respect to the main collection layer.

In this air filter medium, the main collection layer can be supported by the air-permeable supporting member from the downstream side of the air flow, which can suppress deformation due to wind pressure in operation.

Advantageous Effects of Invention

In the air filter medium according to the present invention, the decrease in collection efficiency in the case where a main collection layer and a pre-collection layer having a lower collection efficiency than the main collection layer are used can be reduced.

DESCRIPTION OF EMBODIMENTS

Figure 1:
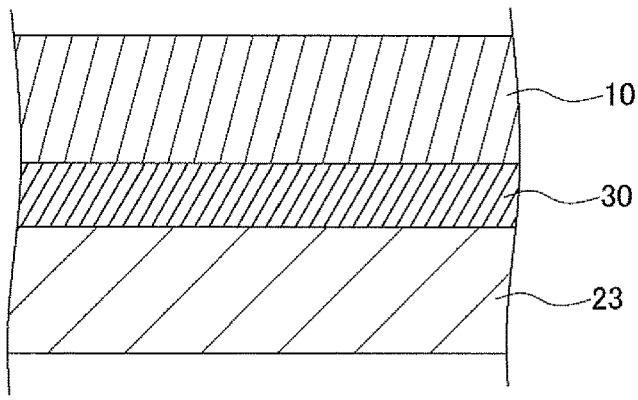
FIG. 1 is a schematic sectional view illustrating a layer structure of a filter medium according to this embodiment.

Hereafter, an air filter medium (hereafter also simply referred to as a filter medium) will be described based on embodiments.
(1) Air Filter Medium
FIG. 1 is a schematic sectional view of an air filter medium 1 having a three-layer structure according to this embodiment that is one example of air filter media.

The air filter medium 1 is an air filter medium that collects dust in gas and includes a pre-collection layer 10, a main collection layer 30, and a downstream air-permeable supporting member 23 in this order from the upstream side of an air flow.

The main collection layer 30 mainly contains a fluororesin. The downstream air-permeable supporting member 23 is disposed on the downstream side of an air flow with respect to the main collection layer 30 and supports the main collection layer 30. The pre-collection layer 10 is disposed on the upstream side of an air flow with respect to the main collection layer 30 and collects a part of dust in the air flow.

Hereafter, the layers and the relationship between the layers will be specifically described.
(2) Main Collection Layer
The main collection layer 30 mainly contains a fluororesin and has a porous film structure including fibrils (fibers, not illustrated) and nodes (nodal portions, not illustrated) connected to the fibrils.

Herein, the term "mainly" means that when a plurality of components are contained, the fluororesin has the highest content. The main collection layer 30 may contain a fluororesin in an amount of, for example, more than 50 wt % relative to the total amount of constituent components. That is, the main collection layer 30 may contain a component other than the fluororesin in an amount of less than 50 wt %.

An example of the component other than the fluororesin is an inorganic filler that is a non-fibril-forming non-melting-processable component (B component) described later.

The fluororesin used for the main collection layer 30 may be formed of one component or two or more components. An example of the fluororesin formed of two or more components is a three-component mixture of a fibril-forming PTFE (hereafter also referred to as an A component), a non-fibril-forming non-melting-processable component (hereafter also referred to as a B component), and a non-fibril-forming hot-melt-processable component (hereafter also referred to as a C component) having a melting point of lower than 320° C. The main collection layer 30 is preferably formed of these three components in a combined manner. The main collection layer 30 formed of these three components has a film structure with a higher porosity and a larger thickness than known fibril-forming PTFE (high-molecular-weight PTFE) porous films. Therefore, fine particles in gas can be collected in a large region in a thickness direction of the filter medium, which can improve the dust-holding capacity.

Hereafter, the above three components will be described in detail.

(2-1) A Component: Fibril-Forming PTFE

The fibril-forming PTFE is, for example, a high-molecular-weight PTFE obtained through emulsion polymerization or suspension polymerization of tetrafluoroethylene (TFE).

The high molecular weight herein is a molecular weight at which fibrillation is easily caused and fibrils having a large fiber length are obtained during drawing in the production of a porous film, the standard specific gravity (SSG) is 2.130 or more and 2.230 or less, and the melt flow substantially does not occur because of the high melt viscosity. The standard specific gravity (SSG) of the fibril-forming PTFE is preferably 2.130 or more and 2.190 or less and more preferably 2.140 or more and 2.170 or less from the viewpoint of achieving ease of fibrillation and providing fibrils having a large fiber length. An excessively high SSG may deteriorate the drawability of the mixture of the components A to C. An excessively low SSG deteriorates the rollability and thus deteriorates the uniformity of the porous film, which may increase the pressure loss of the porous film. From the viewpoint of achieving ease of fibrillation and providing fibrils having a large fiber length, a PTFE obtained through emulsion polymerization is preferred. The standard specific gravity (SSG) is measured in conformity to ASTM D 4895.

The presence or absence of fibrillability, that is, whether fibrillation is achieved or not can be judged by checking whether paste extrusion, which is a typical method for forming a high-molecular-weight PTFE powder obtained from a polymer of TFE, can be performed or not. Normally, paste extrusion can be performed because a high-molecular-weight PTFE has fibrillability. In the case where an unfired formed body obtained through paste extrusion substantially does not have strength or elongation, such as the case where the formed body has an elongation of 0% and is broken when stretched, such a formed body is considered to have no fibrillability.

The high-molecular-weight PTFE may be a modified polytetrafluoroethylene (hereafter referred to as a modified PTFE), a homo-polytetrafluoroethylene (hereafter referred to as a homo-PTFE), or a mixture of a modified PTFE and a homo-PTFE. Non-limiting examples of the homo-PTFE that can be suitably used include homo-PTFEs disclosed in Japanese Laid-Open Patent Publication No. S53-60979, Japanese Laid-Open Patent Publication No. S57-135, Japanese Laid-Open Patent Publication No. S61-16907, Japanese Laid-Open Patent Publication No. S62-104816, Japanese Laid-Open Patent Publication No. S62-190206, Japanese Laid-Open Patent Publication No. S63-137906, Japanese Laid-Open Patent Publication No. 2000-143727, Japanese Laid-Open Patent Publication No. 2002-201217, International Publication No. 2007/046345, International Publication No. 2007/119829, International Publication No. 2009/001894, International Publication No. 2010/113950, and International Publication No. 2013/027850. In particular, homo-PTFEs disclosed in Japanese Laid-Open Patent Publication No. S57-135, Japanese Laid-Open Patent Publication No. S63-137906. Japanese Laid-Open Patent Publication No. 2000-143727, Japanese Laid-Open Patent Publication No. 2002-201217, International Publication No. 2007/046345, International Publication No. 2007/119829, and International Publication No. 2010/113950 are preferred from the viewpoint of high drawability.

The modified PTFE is constituted by TFE and a monomer other than TFE (hereafter referred to as a modifying monomer). Non-limiting examples of the modified PTFE include PTFEs homogeneously modified by the modifying monomer. PTFEs modified at the beginning of polymerization reaction, and PTFEs modified at the end of polymerization reaction. Examples of the modified PTFE that can be suitably used include modified PTFEs disclosed in Japanese Laid-Open Patent Publication No. S60-42446, Japanese Laid-Open Patent Publication No. S61-16907, Japanese Laid-Open Patent Publication No. S62-104816, Japanese Laid-Open Patent Publication No. S62-190206, Japanese Laid-Open Patent Publication No. S64-1711, Japanese Laid-Open Patent Publication No. H02-261810, Japanese Laid-Open Patent Publication No. H11-240917, Japanese Laid-Open Patent Publication No. H11-240918, International Publication No. 2003/033555, International Publication No. 2005/061567, International Publication No. 2007/005361, International Publication No. 2011/055824, and International Publication No. 2013/027850. In particular, modified PTFEs disclosed in Japanese Laid-Open Patent Application Publication No. S61-16907, Japanese Laid-Open Patent Application Publication No. S62-104816, Japanese Laid-Open Patent Application Publication No. S64-1711, Japanese Laid-Open Patent Application Publication No. H11-240917, International Publication No. 2003/033555, International Publication No. 2005/061567, International Publication No. 2007/005361, and International Publication No. 2011/055824 are preferred from the viewpoint of high drawability.

The modified PTFE contains a TFE unit based on TFE and a modifying monomer unit based on the modifying monomer. The modifying monomer unit is a moiety in a molecular structure of the modified PTFE, the moiety being derived from the modifying monomer. The content of the modifying monomer unit in all monomer units of the modified PTFE is preferably 0.001 wt % or more and 0.500 wt % or less and more preferably 0.01 wt % or more and 0.30 wt % or less. All monomer units are moieties derived from all monomers in a molecular structure of the modified PTFE.

The modifying monomer is not limited as long as the modifying monomer is copolymerizable with TFE. Examples of the modifying monomer include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; and perfluoroalkylethylenes (PFAE) and ethylene. A single modifying monomer may be used or a plurality of modifying monomers may be used.

The perfluorovinyl ethers are not limited. For example, an unsaturated perfluoro-compound represented by general formula (I) below can be used.

$$CF_2=CF-ORf \quad (1)$$

In the formula, Rf represents a perfluoro organic group.

In this specification, the perfluoro organic group is an organic group obtained by substituting all hydrogen atoms bonding to carbon atoms with fluorine atoms. The perfluoro organic group ma) contain an ether oxygen atom.

An example of the perfluorovinyl ether is a perfluoroalkyl vinyl ether (PAVE) with Rf representing a perfluoroalkyl group having 1 to 10 carbon atoms in the general formula (1). The perfluoroalkyl group preferably has 1 to 5 carbon atoms. Examples of the perfluoroalkyl group in PAVE include a perfluoromethyl group, a perfluoroethyl group, a perfluoropropyl group, a perfluorobutyl group, a perfluoropentyl group, and a perfluorohexyl group. The PAVE is preferably perfluoropropyl vinyl ether (PPVE) or perfluoromethyl vinyl ether (PMVE).

Non-limiting examples of the perfluoroalkylethylenes (PFAE) include perfluorobutylethylene (PFBE) and perfluorohexylethylene (PFHE).

The modifying monomer in the modified PTFE is preferably at least one monomer selected from the group consisting of HFP, CTFE, VDF, PAVE, PFAE, and ethylene.

The content of the homo-PTFE in the fibril-forming PTFE is particularly preferably more than 50 wt % from the viewpoint of achieving ease of fibrillation and providing fibrils having a large fiber length.

The fibril-forming PTFE may contain the above-described components in a combined manner.

The content of the fibril-forming PTFE in the porous film is preferably more than 50 wt % from the viewpoint of maintaining the fibrous structure of the porous film.

(2-2) B Component: Non-Fibril-Forming Non-Melting-Processable Component

The non-fibril-forming non-melting-processable component is mainly unevenly distributed in the nodal portions as non-fibrous particles and has a function of suppressing fibrillation of the fibril-forming PTFE.

Examples of the non-fibril-forming non-melting-processable component include components having thermoplasticity, such as low-molecular-weight PTFEs; thermosetting resins; inorganic fillers; and mixtures of the foregoing.

The component having thermoplasticity preferably has a melting point of 320° C. or higher and has as high a melt viscosity as possible. For example, the low-molecular-weight PTFE has a high melt viscosity and therefore can remain in the nodal portions even when processed at a temperature higher than or equal to the melting point. In this specification, the low-molecular-weight PTFE is a PTFE having a number-average molecular weight of 600.000 or less, a melting point of 320° C. or higher and 335° C. or lower, and a melt viscosity at 380° C. of 100 Pa·s or more and $7.0\times10^5$ Pa·s or less (refer to Japanese Laid-Open Patent Publication No. H10-147617).

Examples of the method for producing a low-molecular-weight PTFE include a method in which a high-molecular-weight PTFE powder (molding powder) obtained through suspension polymerization of TFE or a high-molecular-weight PTFE powder (fine powder) obtained through emulsion polymerization of TFE and a particular fluoride are thermally decomposed by causing a catalytic reaction at high temperature (refer to Japanese Laid-Open Patent Publication No. S61-162503), a method in which the high-molecular-weight PTFE powder or a formed body is irradiated with ionizing radiation (refer to Japanese Laid-Open Patent Publication No. S48-78252), and a method in which TFE is directly polymerized together with a chain transfer agent (refer to, e.g., International Publication No. 2004/050727, International Publication No. 2009/020187, and International Publication No. 2010/114033). The low-molecular-weight PTFE may be a homo-PTFE or a modified PTFE containing the above-described modifying monomer as in the case of the fibril-forming PTFE.

The low-molecular-weight PTFE has no fibrillability. The presence or absence of fibrillability can be judged by the above-described method. For the low-molecular-weight PTFE, an unfired formed body obtained through paste extrusion substantially does not have strength or elongation. For example, the low-molecular-weight PTFE has an elongation of 0% and is broken when stretched.

The low-molecular-weight PTFE is not limited. The melt viscosity of the low-molecular-weight PTFE at 380° C. is preferably 1000 Pa·s or more, more preferably 5000 Pa·s or more, and further preferably 10000 Pa·s or more. At a high melt viscosity, even if the non-fibril-forming hot-melt-processable component serving as a C component is melted during production of the porous film, the non-fibril-forming non-melting-processable component can remain in the nodal portions, which can suppress the fibrillation.

Examples of the thermosetting resin include epoxy resin, silicone resin, polyester resin, polyurethane resin, polyimide resin, phenolic resin, and mixtures of the foregoing resins. The thermosetting resin is desirably an uncured resin dispersed in water from the viewpoint of workability of co-coagulation described later. Each of these thermosetting resins is commercially available.

Examples of the inorganic filler include talc, mica, calcium silicate, glass fiber, calcium carbonate, magnesium carbonate, carbon fiber, barium sulfate, calcium sulfate, and mixtures of the foregoing. In particular, talc is preferably used from the viewpoint of specific gravity and affinity with a fibrillating high-molecular-weight PTFE. The inorganic filler preferably has a particle size of 3 μm or more and 20 μm or less from the viewpoint of formation of a stable dispersion body during production of the porous film. The particle size is an average particle size measured by a laser diffraction/scattering method. Each of these inorganic fillers is commercially available.

The non-fibril-forming non-melting-processable component may contain the above-described components in a combined manner.

The content of the non-fibril-forming non-melting-processable component in the porous film is preferably 1 wt % or more and 50 wt % or less. When the content of the non-fibril-forming non-melting-processable component is 50 wt % or less, the fibrous structure of the porous film is easily maintained. The content of the non-fibril-forming non-melting-processable component is preferably 20 wt % or more and 40 wt % or less and more preferably 30 wt %. When the content is 20 wt % or more and 40 wt % or less, the fibrillation of the fibril-forming PTFE can be more effectively suppressed.

(2-3) C Component: Non-Fibril-Forming Hot-Melt-Processable Component Having Melting Point of Lower than 320° C.

The non-fibril-forming hot-melt-processable component having a melting point of lower than 320° C. (hereafter also referred to as a non-fibril-forming hot-melt-processable component) has flowability when melted. Therefore, the non-fibril-forming hot-melt-processable component can be melted during production (drawing) of the porous film and cured in the nodal portions. This increases the strength of the whole porous film and thus can suppress the deterioration of filter performance even if the porous film is compressed, for example, in the downstream processes.

The non-fibril-forming hot-melt-processable component preferably has a melt viscosity of less than 10000 Pa·s at 380° C. The melting point of the non-fibril-forming hot-melt-processable component is a temperature at a peak of a melting curve obtained when the component is heated to a temperature higher than or equal to the melting point at a heating rate of 10° C./min to be completely melted once, cooled to a temperature lower than or equal to the melting point at 10° C./min, and then heated again at 10° C./min using a differential scanning calorimeter (DSC).

Examples of the non-fibril-forming hot-melt-processable component include components that sufficiently exhibit meltability and flowability at a drawing temperature during production of the porous film, such as heat-meltable fluoropolymer, polystyrene resin, polyethylene terephthalate (PET) resin, polyester resin, polyamide resin, and mixtures of the foregoing resins. In particular, a heat-meltable fluoropolymer is preferred from the viewpoint of high heat resistance at a drawing temperature during production of the porous film and high chemical resistance. The heat-meltable fluoropolymer is a fluoropolymer having a copolymer unit derived from at least one fluorinated ethylenically unsaturated monomer, preferably two or more fluorinated ethylenically unsaturated monomers, represented by general formula (2) below.

$$RCF=CR_2 \quad (2)$$

(In the formula, R are each independently selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms. In this case, all R may be the same, any two R may be the same and the remaining one R may be different from the two R, or all R may be different from each other.)

Non-limiting useful examples of the compound represented by the general formula (2) include perfluoroolefins such as fluoroethylene, VDF, trifluoroethylene, TFE, and HFP; chlorofluoroolefins such as CTFE and dichlorodifluoroethylene; (perfluoroalkyl)ethylenes such as PFBE and PFHE; perfluoro-1,3-dioxole, and mixtures of the foregoing.

The fluoropolymer may contain a copolymer derived from copolymerization of at least one monomer represented by the general formula (2) and at least one copolymerizable comonomer represented by the above general formula (1) and/or general formula (3) below.

$$R_2C=CR_2 \quad (3)$$

(In the formula, R are each independently selected from H, Cl, an alkyl group having 1 to 8 carbon atoms, an aryl group having 6 to 8 carbon atoms, and a cyclic alkyl group having 3 to 10 carbon atoms. In this case, all R may be the same, any two or more R may be the same and the remaining R may be different from the two or more R, or all R may be different from each other. If the remaining R are plural R, the plural R may be different from each other.) A useful example of the compound represented by the general formula (1) is a perfluoroalkyl vinyl ether (PAVE). The PAVE is preferably perfluoropropyl vinyl ether (PPVE) or perfluoromethyl vinyl ether (PMVE).

Useful examples of the compound represented by the general formula (3) include ethylene and propylene.

Specific examples of the fluoropolymer include polyfluoroethylene derived from polymerization of fluoroethylene, polyvinylidene fluoride (PVDF) derived from polymerization of vinylidene fluoride (VDF), polychlorotrifluoroethylene (PCTFE) derived from polymerization of chlorotrifluoroethylene (CTFE), fluoropolymers derived from copolymerization of two or more different monomers represented by the general formula (2), and fluoropolymers derived from copolymerization of at least one monomer represented by the general formula (2) and at least one monomer represented by the general formula (1) and/or at least one monomer represented by the general formula (3).

Examples of the polymer include polymers having a copolymer unit derived from VDF and hexafluoropropylene (HFP) and polymers derived from TFE and at least one copolymerizable comonomer (at least 3 wt %) other than TFE. Examples of the latter fluoropolymer include TFE/PAVE copolymers (PFA), TFE/PAVE/CTFE copolymers, TFE/HFP copolymers (FEP), TFE/ethylene copolymers (ETFE), TFE/HFP/ethylene copolymers (EFEP), TFE/VDF copolymers, TFE/VDF/HFP copolymers, TFE/VDF/CTFE copolymers, and mixtures of the foregoing copolymers.

The non-fibril-forming hot-melt-processable component may contain the above-described components in a combined manner.

The content of the non-fibril-forming hot-melt-processable component in the porous film is preferably 0.1 wt % or more and less than 20 wt %. When the content is less than 20 wt %, the non-fibril-forming hot-melt-processable component is dispersed in portions other than the nodal portions in the porous film, which reduces an increase in the pressure loss of the porous film. Furthermore, when the content is less than 20 wt %, drawing is easily performed at a high area stretch magnification of 40 times or more, which will be described later. When the content of the non-fibril-forming hot-melt-processable component in the porous film is 0.1 wt % or more, the deterioration of filter performance of the porous film tends to be sufficiently suppressed even if a compressive force or the like is exerted in the post processes. The content of the non-fibril-forming hot-melt-processable component in the porous film is preferably 15 wt % or less and more preferably 10 wt % or less. The content of the non-fibril-forming hot-melt-processable component in the porous film is preferably 0.5 wt % or more from the viewpoint of ensuring the strength of the porous film. The content is particularly preferably about 5 wt %.

The content of the non-fibril-forming hot-melt-processable component is preferably 10 wt % or less to satisfactorily perform drawing at an area stretch magnification of 40 times or more and 800 times or less.

In the porous film formed of the above-described three components, the fibrils are mainly formed of the A component and the nodal portions are formed of the A to C components. Such nodal portions are formed in the porous film so as to have a relatively large size, which allows forming of a thick porous film. The nodal portions contain the non-fibril-forming hot-melt-processable component and thus are relatively hard, and serve as pillars that support the porous film in the thickness direction. Therefore, the deterioration of filter performance of the porous film can be suppressed even if a compressive force or the like is exerted in the thickness direction in the post processes such as stacking of an air-permeable supporting member and pleating described later.

(2-4) Other Properties of Porous Film

The average fiber diameter of the main collection layer 30 is preferably 0.05 μm or more and 0.30 μm or less and may be 0.05 μm or more and 0.20 μm or less.

The average fiber diameter is determined as follows. First, a surface of a test specimen is captured using a scanning electron microscope (SEM) at a magnification of 1000 to 5000 times. Two lines orthogonal to each other are drawn on a single captured image, and the width of a fiber image that intersects these lines is measured as a fiber diameter. The number of fibers measured is set to 200 or more. The measured fiber diameters are plotted on a lognormal scale, with the horizontal axis representing a fiber diameter and the vertical axis representing a cumulative frequency. A value at a cumulative frequency of 50% is defined as an average fiber diameter. The geometric standard deviation that shows the distribution of the fiber diameters is determined by reading a fiber diameter at a cumulative frequency of 50% and a fiber diameter at a cumulative frequency of 84% from the above lognormal plot and performing calculation using the following formula.

Geometric standard deviation(−)=Fiber diameter at cumulative frequency84%/Fiber diameter at cumulative frequency 50%

The same applies to the description of the average fiber diameter below.

The thickness of the main collection layer 30 is preferably more than 10 μm and more preferably more than 40 μm from the viewpoint of increasing the dust-holding capacity and the collection efficiency. The upper limit of the thickness of the main collection layer 30 is not limited, and can be set to, for example, 250 μm or may be set to 150 μm.

The thickness of one layer is determined by stacking five layers to be measured, measuring the total thickness of the five layers, and dividing the total thickness by 5.

The average pore size of the main collection layer 30 is preferably 1.6 μm or more and 3.9 μm or less or may be 2.0 μm or more and 3.5 μm or less. This tends to increase the dust-holding capacity of the main collection layer 30, which facilitates an improvement in the dust-holding capacity of the whole air filter medium 1.

The average pore size is measured in conformity to ASTM F316-86. The average pore size is also referred to as an average passage diameter.

The pressure loss of the main collection layer 30 may be 30 Pa or more and 200 Pa or less or may be 80 Pa or more and 170 Pa or less.

The pressure loss is a pressure loss obtained when air is passed at a flow velocity of 5.3 cm/s. In the following description, this is also simply referred to as a pressure loss.

The collection efficiency of the main collection layer 30 may be, for example, 75% or more and 99.9999% or less or may be 99% or more and 99.999% or less.

The collection efficiency is a collection efficiency of NaCl particles having a particle size of 0.3 μm obtained when air containing the particles is passed at a flow velocity of 5.3 cm/s unless otherwise specified. In the following description, this is also simply referred to as a collection efficiency.

The main collection layer 30 preferably has a filling factor of 1% or more and 20% or less and more preferably has a filling factor of 2% or more and 10% or less. The filling factor is determined from the following formula.

Filling factor (%)={1−(Void volume in porous film/Volume of porous film)}×100

The PAO capacity of the main collection layer 30 may be, for example, 10 $g/m^2$ or more and 45 $g/m^2$ or less or may be 20 $g/m^2$ or more and 35 $g/m^2$ or less.

The PAO capacity is a capacity of polyalphaolefin (PAO) particles having a number median diameter of 0.25 μm obtained when air containing the polyalphaolefin particles is continuously passed at a flow velocity of 5.3 cm/s and the pressure loss is increased by 250 Pa. In the following description, this is also simply referred to as a PAO capacity.

The main collection layer 30 is produced by, for example, a method for producing a porous film in the production method of an air filter medium described later.

(3) Air-Permeable Supporting Member

The downstream air-permeable supporting member 23 is disposed on the downstream side of the main collection layer 30 and supports the main collection layer 30 from the downstream side of an air flow. In the air filter medium 1, the downstream air-permeable supporting member 23 is disposed so as to constitute the most downstream layer. Even if it is difficult to independently use the pre-collection layer 10 and the main collection layer 30 because of their small thickness or low rigidity, the support of the downstream air-permeable supporting member 23 allows the independent use of the layers.

Non-limiting examples of the material and structure of the downstream air-permeable supporting member 23 include nonwoven fabric, woven fabric, metal mesh, and resin net. In particular, a nonwoven fabric having heat fusibility is preferred from the viewpoint of strength, collectability, flexibility, and workability. The nonwoven fabric is preferably a nonwoven fabric in which some or all of constituent fibers have a core-sheath structure, a two-layer nonwoven fabric including a fiber layer formed of a low-melting-point material and a fiber layer formed of a high-melting-point material, or a nonwoven fabric whose surface is coated with a heat fusible resin. Examples of the nonwoven fabric include thermal-bonded nonwoven fabric and spun-bonded nonwoven fabric. The nonwoven fabric having a core-sheath structure is preferably a nonwoven fabric in which the core component has a higher melting point than the sheath component. Examples of the combination of materials for the core and sheath include PET/PE and high-melting-point polyester/low-melting-point polyester. Examples of the combination of the low-melting-point material and the high-melting-point material for the two-layer nonwoven fabric include PE/PET, PP/PET, PBT/PET, and low-melting-point PET/high-melting-point PET. Examples of the nonwoven fabric whose surface is coated with a heat fusible resin include a PET nonwoven fabric whose surface is coated with EVA (ethylene-vinyl acetate copolymer resin) and a PET nonwoven fabric whose surface is coated with an olefin resin.

Non-limiting examples of the material for the nonwoven fabric include polyolefins (e.g., PE and PP), polyamides, polyesters (e.g., PET), aromatic polyamides, and composite materials of the foregoing.

The downstream air-permeable supporting member 23 can be joined to the main collection layer 30 by using an anchor effect due to partial melting of the downstream air-permeable supporting member 23 through heating or due to melting of a hot-melt resin, or by using adhesion of a reactive adhesive or the like.

The downstream air-permeable supporting member 23 may have a pressure loss, a collection efficiency, and a dust-holding capacity much lower than those of the main collection layer 30. The pressure loss, the collection efficiency, and the dust-holding capacity may be values considered to be substantially zero.

The pressure loss obtained when air is passed through the downstream air-permeable supporting member 23 at a flow velocity of 5.3 cm/s is, for example, preferably 10 Pa or less, more preferably 5 Pa or less, and further preferably 1 Pa or less.

The collection efficiency of NaCl particles having a particle size of 0.3 μm obtained when air containing the NaCl particles is passed through the downstream air-permeable supporting member 23 at a flow velocity of 5.3 cm/s may be, for example, a value considered to be substantially zero or about zero.

The thickness of the downstream air-permeable supporting member 23 is, for example, preferably 0.60 mm or less and more preferably 0.50 mm or less. The lower limit of the thickness of the downstream air-permeable supporting member 23 is not limited, and can be set to, for example, 0.1 mm.

The basis weight of the downstream air-permeable supporting member 23 can be set to, for example, 20 g/m$^2$ or more and 150 g/m$^2$ or less and is preferably 50 g/m$^2$ or more and 110 g/m$^2$ or less.

The average fiber diameter of the downstream air-permeable supporting member 23 can be set to, for example, 10 μm or more and 40 μm or less and is preferably 20 μm or more and 35 μm or less.

(4) Pre-Collection Layer

The pre-collection layer 10 is disposed on the upstream side with respect to the main collection layer 30 and can collect part of dust in an air flow. In the air filter medium 1 according to this embodiment, a surface of the pre-collection layer 10 on the downstream side is in contact with a surface of the main collection layer 30 on the upstream side.

The collection efficiency of NaCl particles having a particle size of 0.3 μm obtained when air containing the particles is passed through the pre-collection layer 10 at a flow velocity of 5.3 cm/s is lower than the collection efficiency of the main collection layer 30. Specifically, the collection efficiency of the pre-collection layer 10 is preferably 25% or more and 80% or less and more preferably 25% or more and 55% or less. An excessively low collection efficiency of the pre-collection layer 10 increases the collection load of the main collection layer 30, which causes clogging in the main collection layer 30 early. At an excessively high collection efficiency of the pre-collection layer 10, the clogging of the pre-collection layer 10 itself cannot be neglected, which causes clogging early.

The pressure loss obtained when air is passed through the pre-collection layer 10 at a flow velocity of 5.3 cm/s is, for example, preferably 15 Pa or more and 80 Pa or less and more preferably 20 Pa or more and 50 Pa or less from the viewpoint of reducing the pressure loss of the whole air filter medium 1.

The thickness of the pre-collection layer 10 is preferably 0.10 mm or more and 0.5 mm or less and more preferably 0.15 mm or more and 0.4 mm or less. An excessively small thickness of the pre-collection layer 10 shortens the time for which dust collected in the pre-collection layer 10 flows to and reaches the main collection layer 30 on the downstream side. Furthermore, an excessively small thickness of the pre-collection layer 10 decreases the amount of dust that can be collected in the pre-collection layer 10. An excessively large thickness of the pre-collection layer 10 excessively increases the pressure loss in the pre-collection layer 10. Furthermore, an excessively large thickness of the pre-collection layer 10 excessively increases the thickness of the whole air filter medium 1, which makes it difficult to perform a pleating process.

The basis weight of the pre-collection layer 10 is, for example, preferably 10 g/m$^2$ or more and 50 g/m$^2$ or less and more preferably 15 g/m$^2$ or more and 40 g/m$^2$ or less.

The average fiber diameter of the pre-collection layer 10 is preferably 0.8 μm or more and 4.0 μm or less and more preferably 1.5 μm or more and 3.5 μm or less. If the average fiber diameter is less than 0.8 μm, the collection efficiency increases, but fibers are densely arranged, which excessively increases the pressure loss of the pre-collection layer 10 itself. If the average fiber diameter of the pre-collection layer 10 is more than 4.0 μm, an increase in basis weight for ensuring the collection efficiency excessively increases the thickness of the pre-collection layer 10, which increases the pressure loss in the pre-collection layer 10.

The geometric standard deviation that indicates the spread of the fiber diameter distribution in the pre-collection layer 10 is preferably 2.5 or less and more preferably 2.0 or less. This is because an excessively large geometric standard deviation increases the proportion of fibers having a low collection efficiency per unit fiber, which tends to excessively increase the basis weight and the thickness for achieving a suitable collection efficiency in the pre-collection layer 10.

The PF value of the pre-collection layer 10 is 7 or more and 15 or less and preferably 7 or more and 13 or less from the viewpoint of increasing the dust-holding capacity of the whole filter medium by achieving a good balance between the collection efficiency of the pre-collection layer 10 for reducing the collection load in the main collection layer 30 and the pressure loss of the pre-collection layer 10 for reducing the pressure loss of the whole filter medium.

The PF value is defined by the following formula (hereafter the same applies).

$$PF\text{value}=\{-\log((100-\text{Collection efficiency (\%)})/100))\}/(\text{Pressure loss}(Pa)/1000)$$

The pre-collection layer 10 used in the air filter medium 1 has water repellency.

When the pre-collection layer 10 has water repellency, even in the case where water droplets adhere to the pre-collection layer 10, such as the case where the air filter medium 1 is used in a wet environment, the pre-collection layer 10 can repel the water droplets. This can suppress wetting of dust that strongly adheres to fibers of the pre-collection layer 10 through van der Waals force or electrostatic force, which can suppress the aggregation and growth of particles due to wetting of dust. Thus, the flow of particles collected and then aggregated/grown in the pre-collection layer 10 to the downstream side due to wind pressure can be suppressed. This can delay the clogging of the main collection layer 30 caused when the aggregated/grown particles reach the main collection layer 30 on the downstream side.

For the water repellency of the pre-collection layer 10, the contact angle measured 30 seconds after a 25 vol % aqueous isopropyl alcohol solution is dropped is preferably 90° or more, and the contact angle measured 30 seconds after a 30 vol % aqueous isopropyl alcohol solution is dropped is more preferably 90° or more.

The upper limit of the water repellency of the pre-collection layer 10 is not limited. The contact angle measured 30 seconds after a 95 vol % aqueous isopropyl alcohol solution is dropped may be 90° or less.

The method for imparting water repellency to the pre-collection layer 10 is not limited. For example, the pre-collection layer 10 may be formed by using a raw material containing a chemical agent that exhibits water repellency. Alternatively, a filter medium not having water repellency is provided and a coating material that exhibits water repellency may be applied to the filter medium (e.g., spray coating and dipping into a water-repellent coating material).

Non-limiting examples of the chemical agent that exhibits water repellency include agents containing one or more of fluorine-containing polymers, silicones, and the like.

The fluorine-containing polymer has a repeating unit derived from a fluorine-containing polymerizable compound having a linear or branched fluoroalkyl or fluoroalkenyl group having 1 to 21 carbon atoms.

The fluorine-containing polymerizable compound generally has a carbon-carbon double bond in addition to the fluoroalkyl group or the fluoroalkenyl group. Examples of the fluorine-containing polymerizable compound include (meth)acrylates, epoxy compounds, urethane compounds, and vinyl ether compounds.

The fluoroalkyl group or the fluoroalkenyl group is preferably a perfluoroalkyl group or a perfluoroalkenyl group. The upper limit of the number of carbon atoms of the fluoroalkyl group or the fluoroalkenyl group may be 21, can be set to, for example, 16, or is preferably 6, more preferably 5, and particularly preferably 4.

Examples of the fluoroalkyl group include —$CF_3$, —$CF_2CF_3$, —$CF_2CF_3CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$, —$(CF_2)_7CF_3$, —$(CF_2)_5CF(CF_3)_2$, —$(CF_2)_6CF(CF_3)_2$, and —$(CF_2)_9CF_3$. Examples of the fluoroalkenyl group include —$C(CF(CF_3)_2)=C(CF_3)(CF_2CF_2CF_3)$, —$C(CF(CF_3)_2)=C(CF_3)(CF(CF_3)_2)$, and —$C(CF_3)=C(CF(CF_3)_2)_2$.

The (meth)acrylate among the fluorine-containing polymerizable compounds is, for example, a monomer represented by general formula (4) below.

$$CH_2=C(-X)-C(=O)-Y-Z-Rf \quad (4)$$

(In the formula, X represents a hydrogen atom, a monovalent organic group, or a halogen atom; Y represents —O— or —NH—, Z represents a direct bond or a divalent organic group, Rf represents a fluoroalkyl group having 4 to 6 carbon atoms.)

X in the general formula (4) representing the fluorine-containing polymerizable compound is, for example, a hydrogen atom, a methyl group, a halogen atom, a linear or branched alkyl group having 2 to 21 carbon atoms, a $CFX^1X^2$ group (where $X^1$ and $X^2$ represent a hydrogen atom, a fluorine atom, a chlorine atom, a bromine atom, or an iodine atom), a cyano group, a linear or branched fluoroalkyl group having 1 to 21 carbon atoms, a substituted or unsubstituted benzyl group, or a substituted or unsubstituted phenyl group. X is preferably a hydrogen atom, a methyl group, a fluorine atom, or a chlorine atom and particularly preferably a methyl group.

Y in the general formula (4) representing the fluorine-containing polymerizable compound is preferably —O—.

Z in the general formula (4) representing the fluorine-containing polymerizable compound is, for example, a direct bond, a linear alkylene group or branched alkylene group having 1 to 20 carbon atoms (e.g., a group represented by formula —$(CH_2)_x$— (where x is 1 to 10)), a group represented by formula —$SO_2N(R^1)R^2$— or formula —$CON(R^1)R^2$— (where $R^1$ is an alkyl group having 1 to 10 carbon atoms and $R^2$ is a linear alkylene group or a branched alkylene group having 1 to 10 carbon atoms), a group represented by formula —$CH_2CH(OR^3)CH_2$— (where $R^3$ is a hydrogen atom or an acyl group having 1 to 10 carbon atoms (e.g., formyl or acetyl)), a group represented by formula —Ar—$(CH_2)r$- (where Ar is an arylene group optionally having a substituent and r is 0 to 10), or a —$(CH_2)_m$—$SO_2$—$(CH_2)_n$— group or a —$(CH_2)_m$—S—$(CH_2)_n$— group (where m is 1 to 10 and n is 0 to 10). Z is preferably a direct bond, an alkylene group having 1 to 20 carbon atoms, or —$SO_2N(R^1)R^2$— and particularly preferably —$(CH_2)_2$—.

Rf in the general formula (4) representing the fluorine-containing polymerizable compound is preferably a perfluoroalkyl group or may be a fluoroalkyl group having a hydrogen atom. The number of carbon atoms in Rf is preferably 1 to 21, more preferably 4 or 6, and particularly preferably 6. Examples of Rf include —$CF_2CF_2CF_2CF_3$, —$CF_2CF(CF_3)_2$, —$C(CF_3)_3$, —$(CF_2)_5CF_3$, and —$(CF_2)_3CF(CF_3)_2$.

The (meth)acrylate among the fluorine-containing polymerizable compounds is specifically listed below, but is not limited thereto.

$CH_2=C(-H)-C(=O)-O-(CH_2)_2-Rf$
$CH_2=C(-H)-C(=O)-O-C_6H_4-Rf$
$CH_2=C(-Cl)-C(=O)-O-(CH_2)_2-Rf$
$CH_2=C(-H)-C(=O)-O-(CH_2)_2N(-CH_3)SO_2-Rf$
$CH_2=C(-H)-C(=O)-O-(CH_2)N(-C_2H_5)SO_2-Rf$
$CH_2=C(-H)-C(=O)-O-CH_2CH(-OH)CH_2-Rf$
$CH_2=C(-H)-C(=O)-O-CH_2CH(-OCOCH_3)CH_2-Rf$
$CH_2=C(-H)-C(=O)-O-(CH_2)_2-S-Rf$
$CH_2=C(-H)-C(=O)-O-(CH_2)_2-S-(CH_2)_2-Rf$
$CH_2=C(-H)-C(=O)-O-(CH_2)_3-SO_2-Rf$
$CH_2=C(-H)-C(=O)-O-(CH_2)_2-SO_2-(CH_2)_2-Rf$
$CH_2=C(-H)-C(=O)-NH-(CH_2)_2-Rf$
$CH_2=C(-CH_3)-C(=O)-O-(CH_2)_2-Rf$
$CH_2=C(-CH_3)-C(=O)-O-C_6H_4-Rf$
$CH_2=C(-CH_3)-C(=O)-O-(CH_2)_2N(-CH_3)SO_2-Rf$
$CH_2=C(-CH_3)-C(=O)-O-(CH_2)_2N(-C_2H_5)SO_2-Rf$
$CH_2=C(-CH_3)-C(=O)-O-CH_2CH(-OH)CH_2-Rf$
$CH_2=C(-CH_3)-C(=O)-O-CH_2CH(-OCOCH_3)CH_2-Rf$
$CH_2=C(-CH_3)-C(=O)-O-(CH_2)_2-S-Rf$
$CH_2=C(-CH_3)-C(=O)-O-(C-H_2)_2-S-(CH_2)_2-Rf$
$CH_2=C(-CH_3)-C(=O)-O-(CH_2)_3-SO_2-Rf$
$CH_2=C(-CH_3)-C(=O)-O-(CH_2)_2-SO_2-(CH_2)_2-Rf$
$CH_2=(-CH_3)-C(=O)-NH-(CH_2)_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH-_2)_2-Rf$
$CH_2=C(-F)-C(=O)-NH-(CH_2)_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-NH-(CH_2)_2-Rf$

CH$_2$=C(—CF$_3$)—C(=O)—O—(CH$_2$)$_2$—S—Rf
CH$_2$=C(—CF$_3$)—C(=O)—O—(CH$_2$)$_2$—S—(CH$_2$)$_2$—Rf
CH$_2$=C(CF$_3$)—C(=O)—O—(CH$_2$)$_2$—SO$_2$—Rf
CH$_2$=C(—CF$_3$)—C(=O)—O—(CH$_2$)$_2$—SO$_2$—(CH$_2$)$_2$—Rf
CH$_2$=C(—CF$_3$)—C(=O)—NH—(CH$_2$)$_2$—Rf
CH$_2$=C(—CF$_2$H)—C(=O)—O—((CH$_2$)$_2$—S—Rf
CH$_2$=C(—CF$_2$H)—C(=O)—O—((CH$_2$)$_2$—S—(CH$_2$)$_2$—Rf
CH$_2$=C(—CF$_2$H)—C(=O)—O—(CH$_2$)$_2$—SO$_2$—Rf
CH$_2$=C(—CF$_2$H)—C(=O)—O—(CH$_2$)$_2$—SO$_2$—(CH$_2$)$_2$—Rf
CH$_2$=C(—CF$_2$H)—C(=O)—NH—(CH$_2$)$_2$—Rf
CH$_2$=C(—CN)—C(=O)—O—(CH$_2$)$_2$—S—Rf
CH$_2$=C(—CN)—C(=O)—O—(CH$_2$)$_2$—S—(CH$_2$)$_2$—Rf
CH$_2$=C(—CN)—C(=O)—O—(CH$_2$)$_2$—SO$_2$—Rf
CH$_2$=C(—CN)—C(=O)—O—(CH$_2$)$_2$—SO$_2$—(CH$_2$)$_2$—Rf
CH$_2$=C(—CN)—C(=O)—NH—(CH$_2$)$_2$—Rf
CH$_2$=C(—CF$_2$CF$_3$)—C(=O)—O—(CH$_2$)$_2$—S—Rf
CH$_2$=C(—CF$_2$CF$_3$)—C(=O)—O—(CH$_2$)$_2$—S—(CH$_2$)$_2$—Rf
CH$_2$=C(—CF$_2$CF$_3$)—C(=O)—O—(CH$_2$)$_2$—SO$_2$—Rf
CH$_2$=C(—CF$_2$CF$_3$)—C(=O)—O—(CH$_2$)$_2$—SO$_2$—(CH$_2$)$_2$—Rf
CH$_2$=C(—CF$_2$CF$_3$)—C(=O)—NH—(CH$_2$)$_2$—Rf
CH$_2$=C(—F)—C(=O)—O—(CH$_2$)$_3$—S—Rf
CH$_2$=C(—F)—C(=O)—O—(CH$_2$)$_3$—S—(CH$_2$)$_2$—Rf
CH$_2$=C(—F)—C(=O)—O—(CH$_2$)$_3$—SO$_2$—Rf
CH$_2$=(—F)—C(=O)—O—(CH$_2$)$_3$—SO$_2$—(CH$_2$)$_2$—Rf
CH—$_2$=C(—F)—C(=O)—NH—(CH$_2$)$_3$—Rf
CH$_2$=C(—Cl)—C(=O)—O—(CH$_2$)$_3$—S—Rf
CH$_2$C(—Cl)—C(=O)—O—(CH$_2$)$_3$—S—(CH—$_2$)$_2$—Rf
CH$_2$=C(—Cl)—C(=O)—O—(CH$_2$)$_3$—SO$_2$—Rf
CH$_2$=C(—Cl)—C(=O)—O—(CH$_2$)$_3$—SO$_2$—(CH$_2$)$_2$—Rf
CH$_2$=C(—CF$_3$)—C(=O)—O—(CH$_2$)$_3$—S—Rf
CH$_2$=C(—CF$_3$)—C(=O)—O—(CH$_2$)$_3$—S—(CH$_2$)$_2$—Rf
CH$_2$=C(—CF$_3$)—C(=O)—O—(CH$_2$)$_3$—SO$_2$—Rf
CH$_2$=C(—CF$_3$)—C(=O)—O—(CH$_2$)$_3$—SO$_2$—(CH$_2$)$_2$—Rf
CH$_2$=C(—CF$_2$H)—C(=O)—O—(CH$_2$)$_3$—S—Rf
CH$_2$=C(—CF$_2$H)—C(=O)—O—(CH$_2$)$_3$—S—(CH$_2$)$_2$—Rf
CH$_2$=C(—CF$_2$H)—C(=O)—O—(CH$_2$)$_3$—SO$_2$—Rf
CH$_2$=C(—CF$_2$H)—C(=O)—O—(CH$_2$)$_3$—SO$_2$—(CH$_2$)$_2$—Rf
CH$_2$=C(—CN)—C(=O)—O—(CH$_2$)$_3$—S—Rf
CH$_2$=C(—CN)—C(=O)—O—(CH$_2$)$_3$—S—(CH$_2$)$_2$—Rf
CH$_2$=C(—CN)—C(=O)—O—(CH$_2$)$_3$—SO$_2$—Rf
CH$_2$=C(—CN)—C(=O)—O—(CH$_2$)$_3$—SO$_2$—(CH$_2$)$_2$—Rf
CH$_2$=C(—CF$_2$CF$_3$)—C(=O)—O—(CH$_2$)$_3$—S—Rf
CH$_2$=C(—CF$_2$CF$_3$)—C(=O)—O—(CH$_2$)$_3$—S—(CH$_2$)$_2$—Rf
CH$_2$=C(—CF$_2$CF$_3$)—C(=O)—O—(CH$_2$)$_3$—SO$_2$—Rf
CH$_2$=C(—CF$_2$CF$_3$)—C(=O)—O—(CH$_2$)$_2$—SO$_2$—(CH$_2$)$_2$—Rf (In the above formulae, Rf is a fluoroalkyl group having 1 to 21 carbon atoms.)

The epoxy compound among the fluorine-containing polymerizable compounds is, for example, a fluorine-containing epoxy compound represented by general formula (5) below.

(Chem. 1)

(5)

(In the formula, Rf represents a perfluoroalkyl group having 1 to 21 carbon atoms and n represents an integer of 1 or 2.)

The fluorine-containing epoxy compound is specifically listed below.

(Chem. 2)

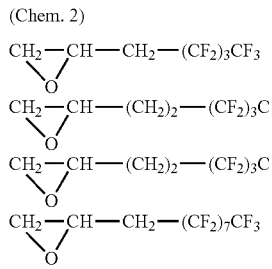

Examples of the fluorine-containing polymer (fluorine-containing compound) obtained by polymerizing the epoxy compound represented by the general formula (5) include polymers having a polyether structure represented by general formula (6) below as a repeating unit, and

(6)

(in the formula. Rf represents a perfluoroalkyl group having 1 to 21 carbon atoms and m represents an integer of 1 or more (e.g., 10 to 1000))

polymers having a polyester structure represented by general formula (7) below as a repeating unit,

(7)

(in the formula, Rf represents a perfluoroalkyl group having 1 to 21 carbon atoms, Ph represents a phenyl group, and m represents an integer of 1 or more (e.g., 10 to 1000)).

The urethane compound among the fluorine-containing polymerizable compounds is, for example, a fluorine-containing urethane compound represented by general formula (8) below.

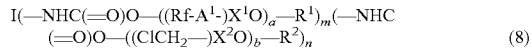
(8)

(In the formula, I is a group obtained by removing an isocyanate group from a polyisocyanate compound,
Rf is a perfluoroalkyl group having 1 to 21 carbon atoms,
$X^1$ and $X^2$ are a linear or branched trivalent aliphatic group having 2 to 5 carbon atoms,
$A^1$ is a direct bond or a divalent organic group having 1 to 21 carbon atoms,
$R^1$ and $R^2$ are a hydrogen atom or an alkyl group having 1 to 10 carbon atoms,
a and b are 1 to 20,
m is 1 to 15,
n is 0 to 14, and
the sum of m and n is 2 to 15.)

In the general formula (8), 1 is a group obtained by removing an isocyanate group from a polyisocyanate compound. The polyisocyanate compound is a compound having at least two isocyanate groups. The polyisocyanate compound may be an aliphatic polyisocyanate, an aromatic polyisocyanate, or a derivative of the foregoing polyisocyanates.

Examples of the aliphatic polyisocyanates, in particular, aliphatic diisocyanates include hexamethylene diisocyanate, isophorone diisocyanate, xylylene diisocyanate, hydrogenated xylylene diisocyanate, and hydrogenated dicyclohexylmethane diisocyanate. Examples of the aromatic polyisocyanates, in particular, aromatic diisocyanates include tolylene diisocyanate, diphenylmethane diisocyanate (MDI), tolidine diisocyanate, and naphthalene diisocyanate.

The polyisocyanate compound is preferably a diisocyanate, a polymeric MDI (diphenylmethane diisocyanate), or a modified isocyanate (in particular, a trimer of diisocyanate or an adduct of polyhydric alcohol and diisocyanate).

Examples of the modified isocyanates include urethane-modified diisocyanates, allophanate-modified diisocyanates, biuret-modified diisocyanates, isocyanurate-modified diisocyanates, carbodiimide-modified diisocyanates, uretonimine-modified diisocyanates, and acylurea diisocyanates.

The fluorine-containing urethane compound is specifically listed below.

The vinyl ether compound among the fluorine-containing polymerizable compounds is, for example, a compound represented b % general formula (9) below.

$$C(\text{-}A)(\text{-}D)=C(-X)-O-Y-(CH_2)_m-Rf \quad (9)$$

(In the formula. A. D, and X are a hydrogen atom, a methyl group, a linear or branched alkyl group having 2 to 20 carbon atoms, a fluorine atom, a chlorine atom, a bromine atom, an iodine atom, a $CFL^1L^2$ group (where $L^1$ and $L^2$ are a hydrogen atom, a fluorine atom, or a chlorine atom), a cyano group, a linear or branched fluoroalkyl group having 1 to 20 carbon atoms, a substituted or unsubstituted benzyl group, or a substituted or unsubstituted phenyl group;

Y is a direct bond, $-CH_2-CH(-OH)-$, or $-(CF_2CF(-CF_3)O-)_g-$ (where g is 1 to 21);

Rf is a linear or branched fluoroalkyl group or fluoroalkenyl group having 1 to 21 carbon atoms; and m is 0 to 10.)

The vinyl ether compound is specifically listed below.

$CF_2=C(-F)-O-Rf$
$CF_2=C(-F)-O-CH_2-Rf$
$CF_2=C(-F)-O-CH_2-CH_2-Rf$
$CH_2=C(-H)-O-CH_2-CH_2-Rf$
$CF_2=C(-F)-O-CH_2-CH(-OH)-CH_2-Rf$
$CH_2=C(-H)-O-CH_2-CH(-OH)-CH_2-Rf$
$CH_2=C(-H)-O-(CF_2-CF(-CF_3)-O)_2-Rf$
$CH_2=C(-Cl)-O-(CF_2-CF(-CF_3)-O)_2-Rf$ (Chem. 3)

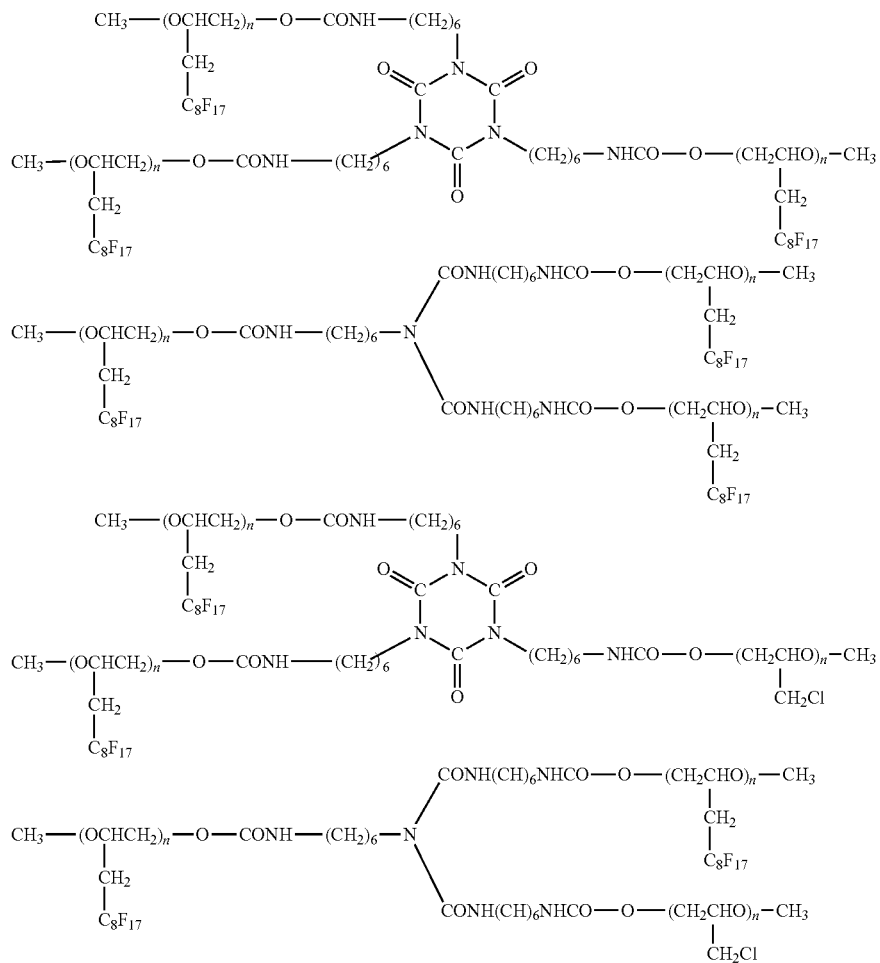

(In the formula, Rf is a linear or branched fluoroalkyl group or fluoroalkenyl group having 1 to 21 carbon atoms.)

The fluorine-containing polymer is preferably a homopolymer of the fluorine-containing polymerizable compound or a copolymer of the fluorine-containing polymerizable compound and a polymerizable compound (in particular, a non-fluorine polymerizable compound) that is copolymerizable with the fluorine-containing polymerizable compound. A compound produced using a publicly known technique can be used.

The silicone serving as a chemical agent that exhibits water repellency is not limited, and may be one of or a mixture of amino-modified silicones, epoxy-modified silicones, carboxy-modified silicones, methyl hydrogen silicones, and dimethyl silicones.

Non-limiting examples of other resins that are mixed with the chemical agent that exhibits water repellency include polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), polyurethane (PU), and mixtures of the foregoing.

The content of the fluorine-containing polymer in the case where the fluorine-containing polymer is mixed with other resins is, for example, preferably 500 ppm or more and 20000 ppm or less and more preferably 1000 ppm or more and 15000 ppm or less. If the content of the fluorine-containing polymer is low, water repellency is sometimes not sufficiently exhibited in the pre-collection layer 10. If the content of the fluorine-containing polymer is excessively high, it may be difficult to perform melt extrusion during spinning.

The fiber or nonwoven fabric produced from a mixture of the fluorine-containing polymer and other resins is preferably annealed (heat-treated) from the viewpoint of causing surface segregation of the fluorine-containing polymer to improve the surface modification effect. The annealing treatment can be performed by, for example, exposing the fiber or nonwoven fabric produced from a mixture of the fluorine-containing polymer and other resins to an environment at 70° C. to 135° C. for about 5 seconds to 10 minutes. At a temperature of 70° C. or lower, the surface modification effect cannot be sufficiently produced. At a high temperature of 135° C. or higher, the formed article may be deformed because of the temperature beyond the melting point of the thermoplastic resin. From the viewpoint of sufficiently improving the surface modification effect, the lower limit of the temperature of the annealing treatment (heat treatment) is preferably 100° C. If the time is shorter than 5 seconds, the surface modification effect cannot be sufficiently produced. If the time is longer than or equal to 10 minutes, the formed article may be deformed and the productivity is decreased.

The MFR (melt flow rate) of the fluorine-containing polymer is not limited, and can be set to, for example, 300 to 3000.

When the nonwoven fabric or the pre-collection layer 10 that is a fiber layer structural body is produced using the above resin, for example, a fiber material produced by one of a melt-blowing process, an electrospinning process, a sea-island process, and a hybrid process of the foregoing is preferably used, but not particularly limited.

The sea-island process is a process in which, for example, when a fiber is produced by performing discharge from a plurality of discharge outlets, different raw materials are used for different discharge paths and one raw material constitutes a sea portion and one of the other raw material constitutes island portions so that the cross-section of the fiber has a sea-island structure. Herein, two polymers or a plurality of polymers for sea and islands are spun and the polymer for sea is melted in the downstream process to leave the island portions, thereby producing a fiber. The combination of the different raw materials for different discharge paths allows adjustment of, for example, bulk density and stretchability.

In the melt-blowing process, yarn is formed by discharging a molten polymer from a nozzle using an extruder while blowing heated air along the nozzle. By adjusting, for example, the amount of polymer discharged from the nozzle per unit time and the blowing rate of heated air, a yarn having a smaller diameter can be obtained. The physical properties of the yarn can also be changed by adjusting the melt viscosity of a polymer used.

(5) Whole Filter Medium

For the whole air filter medium 1, "PF value of the pre-collection layer 10/PF value of the main collection layer 30" that is a ratio of the PF value of the pre-collection layer 10 to the PF value of the main collection layer 30 is preferably 0.20 or more and 0.45 or less and more preferably 0.20 or more and 0.38 or less. When the relationship between the pre-collection layer 10 and the main collection layer 30 in the whole air filter medium 1 satisfies the above range, the pre-collection layer 10 can collect dust such that clogging is not caused early in the pre-collection layer 10, which can moderately reduce the collection load in the main collection layer 30 disposed on the downstream side. Thus, a larger amount of dust can be collected in a large area in the thickness direction.

The pressure loss of the air filter medium 1 is preferably 220 Pa or less and more preferably 70 Pa or more and 210 Pa or less.

The collection efficiency of the air filter medium 1 is preferably 75% or more. The upper limit of the collection efficiency of the air filter medium 1 is, for example, 99.9999%.

The NaCl capacity of the air filter medium 1 is preferably 15 $g/m^2$ or more and more preferably 20 $g/m^2$ or more. The air filter medium 1 according to this embodiment can improve the NaCl capacity while achieving a good balance between collection efficiency and pressure loss.

(6) Modification (6-1)

Figure 2:
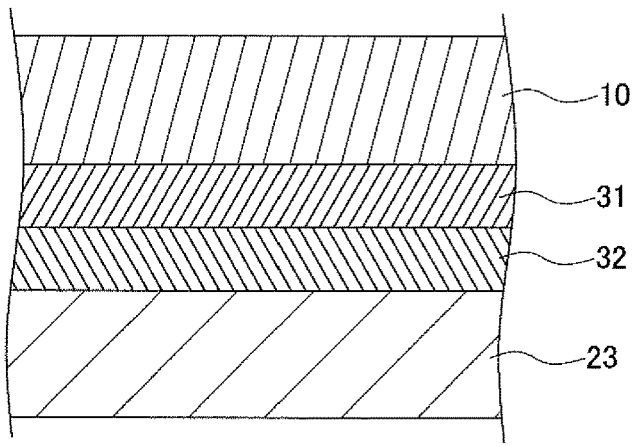
FIG. 2 is a schematic sectional view illustrating a layer structure of a filter medium according to a modification A.

A modification A of an air filter medium 2 according to this embodiment will be described with reference to FIG. 2.

The air filter medium 2 according to the modification A includes a first main collection layer 31 and a second main collection layer 32 instead of the main collection layer 30 of the air filter medium 1 according to the above embodiment. That is, the air filter medium 2 is a filter medium having a four-layer structure including a pre-collection layer 10, a first main collection layer 31, a second main collection layer 32, and a downstream air-permeable supporting member 23 in this order from the upstream side of an air flow.

The pre-collection layer 10 and the downstream air-permeable supporting member 23 are the same as those in the above embodiment, and therefore the description thereof is omitted.

The first main collection layer 31 mainly contains a fluororesin. The second main collection layer 32 mainly contains a fluororesin and is disposed on the downstream side of an air flow with respect to the first main collection layer 31. Herein, the first main collection layer 31 and the second main collection layer 32 are disposed so as to be adjacent to each other.

Not only the first main collection layer 31, but also both the first main collection layer 31 and the second main collection layer 32 are preferably formed of the above-described three components: the A component, the B component, and the C component.

The average pore size of the first main collection layer 31 is preferably 3.0 μm or more and 3.9 μm or less. The average pore size of the second main collection layer 32 is preferably more than 1.6 μm and less than 3.0 μm. This allows the first main collection layer 31 to have a higher dust-holding capacity than the second main collection layer 32, which allows the whole filter medium 1 to have an improved dust-holding capacity.

The thickness of the first main collection layer 31 is preferably 10 μm or more and 100 μm or less and more preferably more than 40 μm. The thickness of the second main collection layer 32 is preferably 10 μm or more and 100 μm or less and more preferably more than 40 μm.

From the viewpoint of considerably improving the dust-holding capacity of the filter medium 2 while maintaining high collection efficiency of the air filter medium 2, the dust-holding capacity of the first main collection layer 31 is preferably differentiated from the dust-holding capacity of the second main collection layer 32 so that the first main collection layer 31 has a higher dust-holding capacity than the second main collection layer 32.

The dust-holding capacity of the first main collection layer 31 and the dust-holding capacity of the second main collection layer 32 can be compared with each other by using, for example, the average of dust-holding capacities measured at 10 to 50 positions of a single porous film. The dust-holding capacity of the first main collection layer 31 is, for example, 25 g/m$^2$ or more and 35 g/m$^2$ or less.

From the viewpoint of improving the dust-holding capacity while maintaining low pressure loss and high collection efficiency, the first main collection layer 31 preferably has a lower pressure loss than the second main collection layer 32.

From the viewpoint of improving the dust-holding capacity while maintaining low pressure loss and high collection efficiency, the second main collection layer 32 has a higher collection efficiency than the first main collection layer 31.

As described above, when the first main collection layer 31 has a lower pressure loss than the second main collection layer 32 and the second main collection layer 32 has a higher collection efficiency than the first main collection layer 31, the first main collection layer 31 disposed on the upstream side does not excessively collect fine particles and the fine particles can be passed to the downstream side to some degree. Furthermore, the second main collection layer 32 disposed on the downstream side can sufficiently collect the line particles. Thus, collection can be performed in a large area of the air filter medium 2 in the thickness direction, which can suppress clogging caused in a layer on the upstream side early.

The pressure loss of the first main collection layer 31 may be 30 Pa or more and 90 Pa or less or may be 40 Pa or more and 80 Pa or less. The pressure loss of the second main collection layer 32 may be 40 Pa or more and 160 Pa or less or may be 50 Pa or more and 100 Pa or less.

The collection efficiency of the first main collection layer 31 is, for example, 95% or more and 99% or less. The collection efficiency of the second main collection layer 32 is, for example, 99% or more and 99.99% or less.

When the first main collection layer 31 on the upstream side has a larger average pore size and thus has a low density (specifically, an average pore size of 3.0 μm or more and 3.9 μm or less), fine particles are passed in the depth (thickness) direction of the air filter medium 2 and collection is performed in a large area of the air filter medium 2 in the thickness direction. Consequently, the dust-holding capacity is believed to be improved. In particular, when the first main collection layer 31 and the second main collection layer 32 produced by using the above three components are used, the thickness can be increased. Therefore, it is believed that a region in which fine particles can be collected can be ensured in the thickness direction, which improves the dust-holding capacity.

The "PF value of the pre-collection layer 10/PF value obtained when the first main collection layer 31 and the second main collection layer 32 are stacked" that is a ratio of the PF value of the pre-collection layer 10 to the PF value obtained when the first main collection layer 31 and the second main collection layer 32 are stacked is preferably 0.20 or more and 0.45 or less and more preferably 0.20 or more and 0.38 or less.

(6-2)

Figure 3:
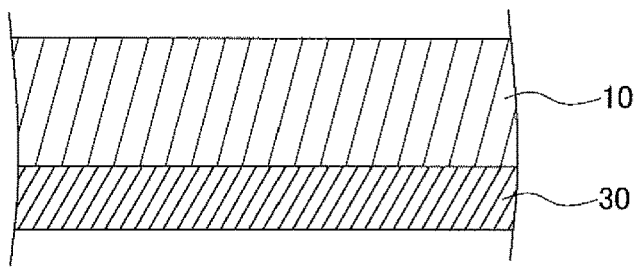
FIG. 3 is a schematic sectional view illustrating a layer structure of a filter medium according to a modification B.

A modification B of an air filter medium 3 according to this embodiment will be described with reference to FIG. 3.

The air filter medium 3 according to the modification B is a filter medium having a structure in which the downstream air-permeable supporting member 23 in the air filter medium 1 according to the above embodiment is omitted.

The pre-collection layer 10 and the main collection layer 30 are the same as those in the above embodiment, and therefore the description thereof is omitted.

The air filter medium 3 has a lower strength than the air filter medium 1 because of the absence of the downstream air-permeable supporting member 23, and thus is not easily used independently. However, strength is sometimes not required depending on the structure and environment of a place at which air filter media are used. In such a case, the air filter medium 3 can be used as an air filter medium.

(6-3)

Figure 4:
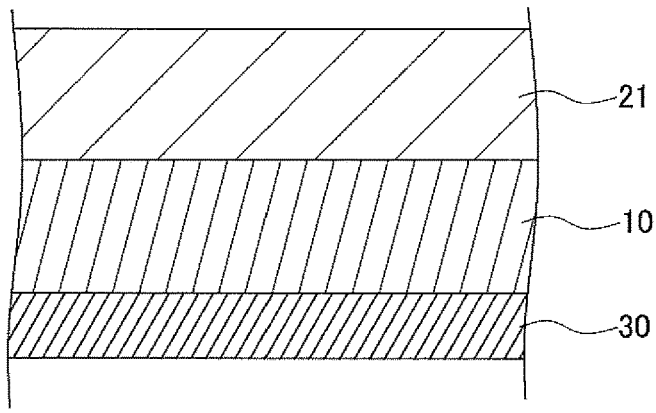
FIG. 4 is a schematic sectional view illustrating a layer structure of a filter medium according to a modification C.

A modification C of an air filter medium 4 according to this embodiment will be described with reference to FIG. 4.

The air filter medium 4 according to the modification C is a filter medium having a structure in which an upstream air-permeable supporting member 21 is disposed instead of the downstream air-permeable supporting member 23 in the air filter medium 1 according to the above embodiment.

The pre-collection layer 10 and the main collection layer 30 are the same as those in the above embodiment, and therefore the description thereof is omitted.

The specific configuration of the upstream air-permeable supporting member 21 is the same as that of the above-described downstream air-permeable supporting member 23.

Even when the upstream air-permeable supporting member 21 is disposed on the upstream side of the pre-collection layer 10 and the main collection layer 30, the pre-collection layer 10 and the main collection layer 30 can also be supported from the upstream side.

In the case where the air filter medium 4 is used in a wet environment, even when water droplets reach the pre-collection layer 10 through the upstream air-permeable supporting member 21, the reaching of dust to the main collection layer 30 can be suppressed as in the case of the air filter medium 1 according to the above embodiment because the pre-collection layer 10 has water repellency.

(6-4)

Figure 5:
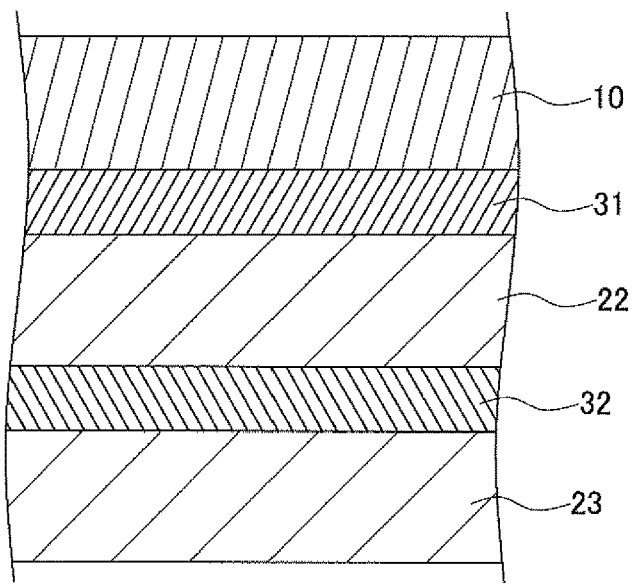
FIG. 5 is a schematic sectional view illustrating a layer structure of a filter medium according to a modification D.

A modification D of an air filter medium 5 according to this embodiment will be described with reference to FIG. 5.

The air filter medium 5 according to the modification D is a filter medium having a structure in which an intermediate air-permeable supporting member 22 is further disposed between the first main collection layer 31 and the second main collection layer 32 in the air filter medium 2 according to the modification A.

The pre-collection layer 10, the first main collection layer 31, the second main collection layer 32, and the downstream air-permeable supporting member 23 are the same as those in the above embodiment and the modification A, and therefore the description thereof is omitted.

The specific configuration of the intermediate air-permeable supporting member 22 is the same as that of the above-described downstream air-permeable supporting member 23.

By disposing the intermediate air-permeable supporting member 22 between the first main collection layer 31 and the second main collection layer 32, the strength of the air filter medium 5 can be further improved.

(6-5)

Figure 6:
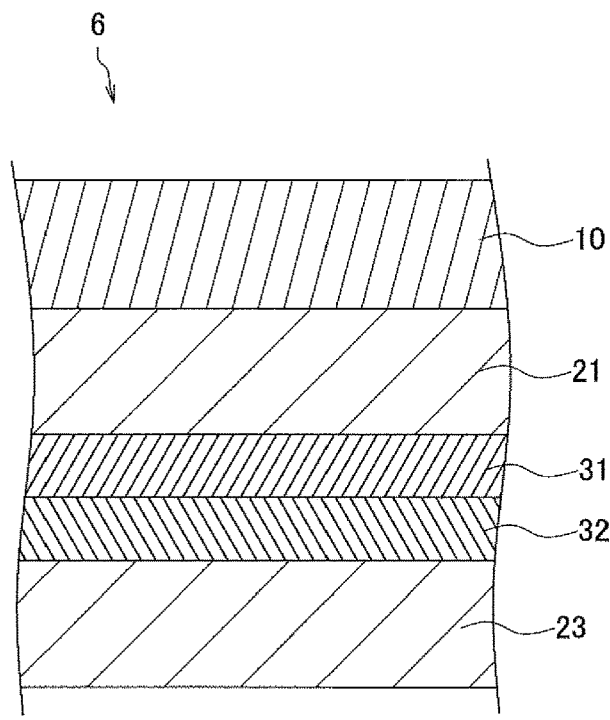
FIG. 6 is a schematic sectional view illustrating a layer structure of a filter medium according to a modification E.

A modification E of an air filter medium 6 according to this embodiment will be described with reference to FIG. 6.

The air filter medium 6 according to the modification E is a filter medium having a structure in which the upstream air-permeable supporting member 21 is disposed between the pre-collection layer 10 and the first main collection layer 31 instead of the intermediate air-permeable supporting member 22 in the air filter medium 5 according to the modification D.

The pre-collection layer 10, the first main collection layer 31, the second main collection layer 32, and the downstream air-permeable supporting member 23 are the same as those in the above embodiment and the modification D, and therefore the description thereof is omitted.

The specific configuration of the upstream air-permeable supporting member 21 is the same as that of the above-described downstream air-permeable supporting member 23.

By disposing the upstream air-permeable supporting member 21 between the pre-collection layer 10 and the first main collection layer 31, the strength of the air filter medium 6 can be further improved.

(6-6)

According to another modification, an air filter medium may be obtained by combining the above embodiment and the above modifications with each other.

(7) Examples of Applications

The air filter medium is used, for example, in the following applications:

ULPA filters (ultra low penetration air filters) (for producing semiconductors). HEPA filters (for hospitals and for producing semiconductors), cylindrical cartridge filters (for industrial use), bag filters (for industrial use), heat-resistant bag filters (for treating exhaust gas), heat-resistant pleated filters (for treating exhaust gas), catalyst filters (for treating exhaust gas), adsorbent-including filters (for installation in HDD), adsorbent-including vent filters (for installation in HDD), vent filters (e.g., for installation in HDD), filters for vacuum cleaners (for vacuum cleaners), general-purpose multilayered felt materials, cartridge filters for gas turbines (interchangeable components for gas turbines), cooling filters (for casings of electronic devices) and the like; and materials for freeze-drying such as freeze-drying bottles, automobile ventilation materials for electronic circuits and lamps, bottle applications such as bottle caps, protective ventilation for electronic devices, and ventilation/internal pressure regulation such as medical ventilation.

(8) Filter Pack

Next, a filter pack according to this embodiment will be described with reference to FIG. 7.

Figure 7:
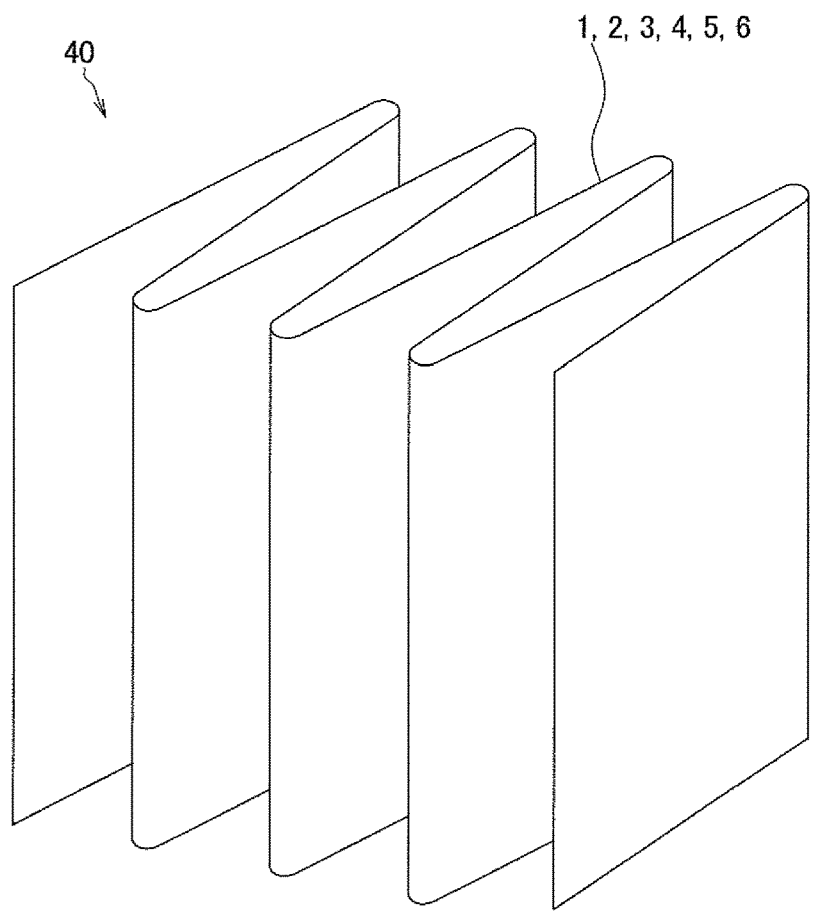
FIG. 7 is an external perspective view of a filter pack.

FIG. 7 is an external perspective view of a filter pack 40 according to this embodiment.

The filter pack 40 includes the above-described air filter medium (e.g., the air filter media 1 to 6). The air filter medium of the filter pack 40 is a filter medium that has been processed into a zigzag pattern in which mountain folds and valley folds are alternately repeated (pleating). The pleating can be performed using, for example, a rotary folding machine. The folding width of the filter medium is not limited, and is, for example, 25 mm or more and 280 mm or less. By performing pleating, the folding area of the filter medium can be increased in the case where the filter pack 40 is used for an air filter unit. Thus, an air filter unit having high collection efficiency can be obtained.

The filter pack 40 may further include, in addition to the filter medium, spacers (not illustrated) for keeping pleat spacing when used for an air filter unit. The material for the spacers is not limited, but is preferably a hot-melt resin.

(9) Air Filter Unit

Next, an air filter unit 60 will be described with reference to FIG. 8.

Figure 8:
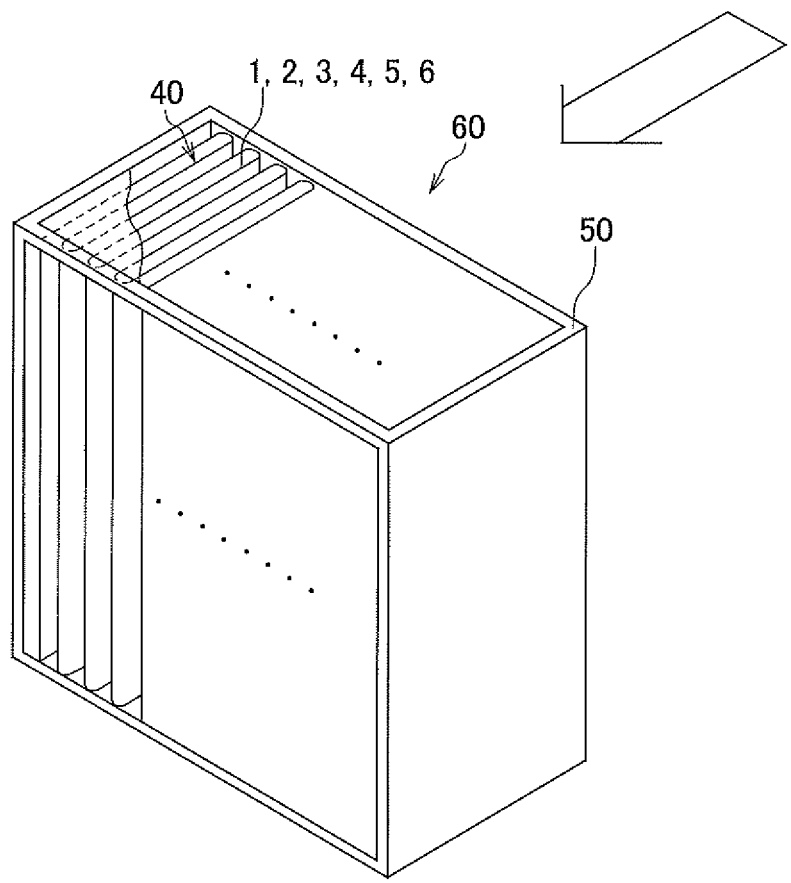
FIG. 8 is an external perspective view of an air filter unit.

FIG. 8 is an external perspective view of an air filter unit 60 according to this embodiment.

The air filter unit 60 includes the above-described air filter medium or filter pack and a frame body 50 that holds the air filter medium or the filter pack. In other words, the air filter unit may be produced such that the filter medium is held by the frame body or such that the filter pack 40 is held by the frame body 50. The air filter unit 60 illustrated in FIG. 8 is produced using the filter pack 40 and the frame body 50.

The frame body 50 is produced by, for example, assembling boards or forming a resin, and the filter pack 40 and the frame body 50 are preferably sealed with each other using a sealer. The sealer is used to prevent leakage between the filter pack 40 and the frame body 50 and is formed of, for example, a resin such as an epoxy resin, an acrylic resin, or a urethane resin.

The air filter unit 60 including the filter pack 40 and the frame body 50 may be a mini-pleat air filter unit in which a single filter pack 40 extending in a flat-plate form is held so as to be accommodated inside the frame body 50 or may be a V-bank air filter unit or a single header air filter unit in which a plurality of filter packs extending in a flat-plate form are arranged and held in the frame body.

On the other hand, the air filter unit including the filter medium and the frame body may be a separator air filter unit in which the filter medium is alternately folded back to form a waveshape and, for example, a corrugated separator is disposed in valley portions of the filter medium that has been alternately folded back.

(10) Method for Producing Air Filter Medium

Next, a method for producing an air filter medium will be described by taking an example.

First, an example of the method for producing a porous film using the above-described three components will be described.

The form of the three components A to C described above is not limited, and is, for example, a composition, a mixed powder, or a forming material described later. A composition, a mixed powder, or a forming material serving as a raw material for the porous film will be described.

The composition, the mixed powder, and the forming material each contain the above-described A component, B component, and C component and each contain the C component in an amount of 0.1 wt % or more and less than 20 wt % relative to the total amount. The A component, the B component, and the C component respectively correspond to the fibril-forming PTFE, the non-fibril-forming non-melting-processable component, and the non-fibril-forming hot-melt-processable component that have been described in the porous film.

The forming material is, for example, a porous film-forming material for forming a porous film used as a filter medium for filters that collect fine particles in gas.

The form of the raw material for the porous film may be a mixed powder described later or a non-powdery mixture or may be a forming material or a composition described later. The mixed powder is, for example, a fine powder obtained through co-coagulation, a powder obtained by mixing two raw materials out of three through co-coagulation and mixing the remaining component using a mixer, or a powder obtained by mixing three raw materials using a mixer. The non-powdery mixture is, for example, a formed body such as a porous body (e.g., a porous film) or an aqueous dispersion body containing the three components.

The forming material is a material adjusted for processing required to form a composition, such as a material to which a processing aid (e.g., liquid lubricant) or the like is added, a material whose grain size is adjusted, or a preformed material. The forming material may contain, for example, a publicly known additive in addition to the above three components. Examples of the publicly known additive include carbon materials such as carbon nanotube and carbon black, pigments, photocatalysts, activated carbon, antimicrobial agents, adsorbents, and deodorizers.

The composition can be produced by various methods. For example, when the composition is a mixed powder, the composition can be produced by a method in which a powder of the A component, a powder of the B component, and a powder of the C component are mixed with each other using a typical mixer or the like, a method in which three aqueous dispersion liquids containing the A component, the B component, and the C component are subjected to co-coagulation to obtain a co-coagulated powder, or a method in which a mixed powder obtained by subjecting aqueous dispersion liquids containing two components out of the A component, the B component, and the C component to co-coagulation in advance is mixed with a powder of the remaining component using a typical mixer or the like. A suitable drawn material can be produced by any of these methods. In particular, the composition is preferably a composition obtained by subjecting three aqueous dispersion liquids containing the A component, the B component, and the C component to co-coagulation from the viewpoint of ease of uniform dispersion of the three different components.

The size of the mixed powder obtained through co-coagulation is not limited. For example, the average particle size is 100 μm or more and 1000 μm or less and preferably 300 μm or more and 800 μm or less. In this case, the average particle size is measured in conformity to JIS K6891. The apparent density of the mixed powder obtained through co-coagulation is not limited. For example, the apparent density is 0.40 g/ml or more and 0.60 g/ml or less and preferably 0.45 g/ml or more and 0.55 g/ml or less. The apparent density is measured in conformity to JIS K6892.

The method for performing co-coagulation is as follow:
(i) a method in which an aqueous dispersion liquid of the A component, an aqueous dispersion liquid of the B component, and an aqueous dispersion liquid of the C component are mixed with each other and then coagulation is performed.

(ii) a method in which an aqueous dispersion liquid containing one of the A component, the B component, and the C component is mixed with powders of the remaining two components and then coagulation is performed.
(iii) a method in which a powder of one of the A component, the B component, and the C component is added to a mixed aqueous dispersion liquid containing aqueous dispersion liquids of the remaining two components in a mixed manner and then coagulation is performed, and
(iv) a method in which a two-component mixed powder obtained by mixing in advance aqueous dispersion liquids of two of the A component, the B component, and the C component and then performing coagulation is added to an aqueous dispersion liquid of the remaining one component and then coagulation is performed.

The method (i) is preferred as a co-coagulation method because the three components are easily dispersed in a uniform manner.

In the co-coagulation performed by the methods (i) to (iv), coagulation is preferably performed by adding any of an acid such as nitric acid, hydrochloric acid, or sulfuric acid or the like; a metal salt such as magnesium chloride, calcium chloride, sodium chloride, aluminum sulfate, magnesium sulfate, barium sulfate, sodium hydrogencarbonate, or sodium carbonate or the like; or an organic solvent such as acetone or methanol or the like.

The form of the A component before mixing is not limited, and may be an aqueous dispersion liquid or a powder of the above-described fibril-forming PTFE. Examples of the powder (in particular, the above-described fine powder) include "Teflon 6-J" (Teflon: registered trademark), "Teflon 6C-J", and "Teflon 62-J" manufactured by Du Pont-Mitsui Fluorochemicals Company, Ltd.; "POLYFLON F106", "POLYFLON F104", "POLYFLON F201", and "POLYFLON F302" (POLYFLON: registered trademark) manufactured by DAIKIN INDUSTRIES, Ltd.; "Fluon CD123", "Fluon CD1", "Fluon CD141", and "Fluon CD145" (Fluon: registered trademark) manufactured by AGC Inc.; and "Teflon 60", "Teflon 60 X", "Teflon 601A", "Teflon 601 X", "Teflon 613A", "Teflon 613A X", "Teflon 605XT X", and "Teflon 669 X" manufactured by Du Pont. Alternatively, the fine powder may be obtained by coagulating and drying an aqueous dispersion liquid (an aqueous dispersion liquid obtained through polymerization) of a fibril-forming PTFE obtained through emulsion polymerization of TFE.

The aqueous dispersion liquid of a fibril-forming PTFE may be the aqueous dispersion liquid obtained through polymerization or a commercially available aqueous dispersion liquid. A preferred method for producing the aqueous dispersion liquid of a fibril-forming PTFE obtained through polymerization is a production method disclosed in the above patent documents for disclosing homo-PTFEs. Examples of the commercially available aqueous dispersion liquid of a fibril-forming PTFE include aqueous dispersion liquids such as "POLYFLON D-110", "POLYFLON D-210". "POLYFLON D-210C", and "POLYFLON D-310" manufactured by DAIKIN INDUSTRIES. Ltd.; "Teflon 31-JR" and "Teflon 34-JR" manufactured by Du Pont-Mitsui Fluorochemicals Company. Ltd.; and "Fluon AD911L". "Fluon AD912L", and "AD938L" manufactured by AGC Inc. To maintain the stability, the aqueous dispersion liquid of the commercially available fibril-forming PTFE contains 2 to 10 parts by weight of a nonionic surfactant or the like relative to 100 parts by weight of the PTFE in the aqueous dispersion liquid. Therefore, the nonionic surfactant is likely to remain in the mixed powder obtained through co-coagulation, which may cause a problem such as coloring of the porous body. Thus, the aqueous dispersion liquid of a fibril-forming PTFE is preferably an aqueous dispersion liquid obtained through polymerization.

The form of the B component before mixing is not limited. When the B component is a low-molecular-weight PTFE, the form of the B component before mixing is not limited, and may be an aqueous dispersion body or a powder (generally referred to as a PTFE micropowder or a micropowder). Examples of the powder of the low-molecular-weight PTFE include "MP1300-J" manufactured by Du Pont-Mitsui Fluorochemicals Company, Ltd.; "Lubron L-5" and "Lubron L-5F" (Lubron: registered trademark) manufactured by DAIKIN INDUSTRIES, Ltd.; "Fluon L169J", "Fluon L170J", and "Fluon L172J" manufactured by AGC Inc.; and "KTL-F" and "KTL-500F" manufactured by KITAMURA Limited.

The aqueous dispersion liquid of the low-molecular-weight PTFE may be the aqueous dispersion liquid obtained through emulsion polymerization of TFE or a commercially available aqueous dispersion liquid. Alternatively, an aqueous dispersion liquid prepared by dispersing a micropowder in water using a surfactant or the like may be used. Examples of the preferred method for producing the aqueous dispersion liquid of the fibril-forming PTFE obtained through polymerization include production methods disclosed in Japanese Laid-Open Patent Publication No. H7-165828, Japanese Laid-Open Patent Publication No. H10-147617, Japanese Laid-Open Patent Publication No. 2006-063140, Japanese Laid-Open Patent Publication No. 2009-1745, and International Publication No. 2009/020187. An example of the commercially available aqueous dispersion liquid of the fibril-forming PTFE is an aqueous dispersion liquid such as "Lubron LDW-410" manufactured by DAIKIN INDUSTRIES, Ltd. To maintain the stability, the commercially available aqueous dispersion liquid of the low-molecular-weight PTFE contains 2 to 10 parts by weight of a nonionic surfactant or the like relative to 100 parts by weight of the PTFE in the aqueous dispersion liquid. Therefore, the nonionic surfactant is likely to remain in the mixed powder obtained through co-coagulation, which may cause a problem such as coloring of the porous body. Thus, the aqueous dispersion liquid of the low-molecular-weight PTFE is preferably an aqueous dispersion liquid obtained through polymerization.

When an inorganic tiller is used as the B component, the form of the B component before mixing is also not limited, and is preferably an aqueous dispersion body. Examples of the inorganic filler include "Talc P2" manufactured by NIPPON TALC Co., Ltd. and "LMR-100" manufactured by FUJI TALC INDUSTRIAL Co., Ltd. They are used by dispersing a powder in water through, for example, appropriate surface treatment using a silane coupling agent or the like. In particular, a secondary crushed product (e.g., "Talc P2") obtained by using a jet mill is preferably used in terms of dispersibility in water.

Examples of the C component include fluororesin such as FEP and PFA and resin such as acrylic resin, urethane resin, and PET resin. The form of the C component before mixing is not limited, and is preferably an aqueous dispersion body. When a resin obtained through emulsion polymerization is used, the aqueous dispersion body may be an as-polymerized dispersion body or a dispersion body obtained by dispersing a resin powder in water using a surfactant or the like. The aqueous dispersion body is prepared by dispersing the C component in water in a predetermined amount so that the porous film contains 0.1 wt % or more and less than 20 wt % of the C component.

The method for performing co-coagulation is not limited. The three aqueous dispersion bodies are preferably mixed with each other and then subjected to mechanical agitation.

After the co-coagulation, dehydration and drying are performed and extrusion is performed using a liquid lubricant (extrusion aid) added. Any liquid lubricant may be used as long as the liquid lubricant can wet the surface of the PTFE powder and is a substance that can be removed after the mixture obtained through co-coagulation is formed into a film. Examples of the liquid lubricant include hydrocarbon oils such as liquid paraffin, naphtha, white oil, toluene, and xylene, alcohols, ketones, and esters.

The mixture obtained through co-coagulation is mixed with a liquid lubricant and then extruded and rolled by a publicly known method. Thus, the mixture is formed into a film-shaped product. The extrusion is performed by, for example, paste extrusion or ram extrusion and preferably by paste extrusion. A sheet-shaped extruded product obtained through paste extrusion is rolled using a calendar roll or the like under heating at a temperature of, for example, 40° C. or higher and 80° C. or lower. The thickness of the obtained film-shaped rolled product is set in accordance with the thickness of the intended porous film and is normally 100 μm or more and 400 μm or less.

Subsequently, the liquid lubricant is removed from the unfired film that is the rolled product. The liquid lubricant is removed by a heating method and/or an extracting method. The heating temperature in the heating method may be any temperature lower than the melting point of the non-fibril-forming hot-melt-processable component, such as 100° C. or higher and 250° C. or lower.

The rolled product from which the liquid lubricant has been removed is drawn at a temperature that is higher than or equal to the melting point of the non-fibril-forming hot-melt-processable component and lower than or equal to the decomposition temperature of the non-fibril-forming non-melting-processable component. In this process, the non-fibril-forming hot-melt-processable component is melted and later cured in the nodal portions, which increases the strength of the porous film in the thickness direction. The drawing temperature at this time may be set in accordance with the temperature of a furnace in which the drawing is performed, the temperature of a heating roller that conveys the rolled product, or a combination of these temperatures.

The drawing is performed in a first direction and preferably in a second direction perpendicular to the first direction. When the porous film is used for embossed air filter media, the drawing is also preferably performed in the second direction. In this embodiment, the first direction is a longitudinal direction (lengthwise direction) of the rolled product and the second direction is a width direction (lateral direction) of the rolled product.

The rolled product is drawn at an area stretch magnification of 40 times or more and 800 times or less. The drawing speed in the first direction is preferably 10%/s or more and 600%/s or less and more preferably 10%/s or more and 150%/s or less. The temperature during the drawing is preferably 200° C. or higher and 350° C. or lower and more preferably 280° C. or higher and 310° C. or lower.

The drawing speed in the second direction is preferably 10%/s or more and 600%/s or less. The temperature during the drawing is preferably 200° C. or higher and 400° C. or lower and more preferably 250° C. or higher and 350° C. or lower. The drawing in the second direction and the drawing in the first direction may be performed simultaneously or separately.

When the rolled product (also referred to as an unfired fluororesin) is drawn, the temperature, the drawing ratio, and the drawing speed during the drawing are known to affect the physical properties of a drawn product. The S—S curve (a graph illustrating the relationship between tensile force and elongation) of the unfired fluororesin shows unique characteristics different from those of other resins. Normally, the tensile force of resin materials increases as the elongation increases. In most cases, for example, the elastic region and the breaking point are dependent on the material and the evaluation conditions whereas the tensile force tends to increase as the elongation increases. In contrast, the unfired fluororesin has a tensile force that shows a peak at a particular elongation and then tends to gradually decrease. This shows that unfired fluororesin has "a region in which portions not subjected to drawing are stronger than portions subjected to drawing".

This will be described in terms of behavior during drawing. In the case of typical resins, drawing starts from the weakest portions in a drawing plane and the drawn portions are stronger than undrawn portions. Therefore, the next weakest undrawn portions are sequentially drawn and the drawn region expands. Consequently, the whole region is drawn. In contrast, in the case of the unfired fluororesin, when drawing starts to be caused in "the region in which portions not subjected to drawing are stronger than portions subjected to drawing", the drawn portions are further drawn. Consequently, the portions not subjected to drawing are left as nodes (nodal portions or undrawn portions). As the drawing speed decreases, this phenomenon becomes noticeable and larger nodes (nodal portions or undrawn portions) are left. By using this phenomenon during drawing, the physical properties of a drawn body are adjusted in accordance with various applications.

In this embodiment, a drawn body having a lower density is preferably obtained, and it is effective to apply a low drawing speed particularly to the drawing in the first direction m. In the case where large nodes (nodal portions or undrawn portions) are left to obtain a formed body having a low filling factor, if only a known PTFE is used as a raw material, the drawing speed of the drawing in the first direction needs to be set to 150%/s or less and preferably 80%/s or less, and the drawing speed of the drawing in the second direction needs to be set to 500%/s or less. However, the low-filling-factor structure of the thus-obtained formed body is easily impaired by external forces.

In this embodiment, the above phenomenon due to a low drawing speed becomes more noticeable because of the presence of the non-fibril-forming non-melting-processable component. As a result, in the range of a drawing speed that can be applied, the drawing speed of the drawing in the first direction can be expanded to 600%/s or less and preferably 150%/s or less and the drawing in the second direction can be expanded to 600%/s or less. Furthermore, the structure can be maintained after the downstream process because of the presence of the non-fibril-forming hot-melt-processable component.

The thus-obtained porous film is preferably subjected to heat setting to achieve mechanical strength and dimensional stability. The temperature during the heat setting may be a temperature higher than or equal to the melting point of PTFE or lower than the melting point of PTFE and is preferably 250° C. or higher and 400° C. or lower.

When a PTFE porous film is produced as the porous film, a publicly known method can be employed.

When a second porous film having physical properties different from those of a first porous film is obtained, the average pore size of a porous film to be obtained can be decreased by setting the content of the liquid lubricant relative to 100 parts by weight of the fluororesin to be smaller in the production of the second porous film than in the production of the first porous film. This can provide a second porous film having a higher pressure loss and a higher collection efficiency than the first porous film. In this case, the difference in the content of the liquid lubricant relative to 100 parts by weight of the fluororesin (liquid lubricant content difference or aid content difference) is preferably 1 part by weight or more and 4 parts by weight or less. When the aid content difference is 1 part by weight or more, the average pore size can be moderately differentiated between the two porous films. When the aid content difference is 4 parts by weight or less, the deterioration of uniformity of drawing can be suppressed. The uniformity of drawing means that the variation in characteristics such as collection efficiency and pressure loss is small in the porous film produced by performing drawing and such characteristics are uniform on the whole porous film. The liquid lubricant content difference is, for example, 2 parts by weight.

The content of the liquid lubricant used in each of the production of the first porous film and the production of the second porous film is preferably 30 parts by weight or more and 37 parts by weight or less relative to 100 parts by weight of the fluororesin. When the content is 30 parts by weight or more, the pressure loss can be decreased, which can decrease the pressure loss of the whole filter medium to less than 200 Pa. When the content is 37 parts by weight or less, the formability of a raw tape described later can be ensured. This can reduce an excessive increase in the load of the second porous film on the downstream side to which fine particles flows without being collected because of an excessive increase in the pore size of the first porous film.

In particular, the content of the liquid lubricant used in the production of the first porous film is, for example, preferably 34 to 36 parts by weight relative to 100 parts by weight of the fluororesin. For example, when 31 to 34 parts by weight of the liquid lubricant is used in the production of the second porous film, 34 to 36 parts by weight of the liquid lubricant can be used in the production of the first porous film to satisfy a liquid lubricant content difference of 1 to 4 parts by weight. Thus, the dust-holding capacity of the filter medium can be considerably increased.

The first porous film and the second porous film can be produced by making an unfired film (hereafter also referred to as a raw tape) by a publicly known method and then by performing biaxial drawing.

The differentiation in average pore size between the two porous films may be achieved by differentiating the mixing ratio of the three components between the two porous films.

Examples of the method for imparting water repellency to the pre-collection layer include a method in which a fluorine-based chemical agent, a silicone-based chemical agent, or a mixture thereof is melt-mixed with a thermoplastic resin and a method in which a fluorine-based chemical agent, a silicone-based chemical agent, or a mixture thereof is applied.

The pre-collection layer, each porous film, and various supporting members may be simply stacked on top of each other to constitute an air filter medium. Alternatively, they may be joined to each other by using an anchor effect due to partial melting through heating or due to melting of a hot-melt resin, or by using adhesion of a reactive adhesive or the like to constitute an air filter medium. The pre-collection layer, the porous film, the supporting member, and the like may be heat-fused with each other or fixed by melting a hot-melt resin using a laminating machine. When a hot-melt resin is heated using a laminating machine, heating is preferably performed to a temperature that is higher than or equal to the melting point of the hot-melt resin and lower than or equal to the melting point of the layers constituting the filter medium. When they are joined to each other using an adhesive, for example, an ethylene-vinyl acetate copolymer (EVA) hot-melt adhesive can be used in an amount of, for example, 2 g/m². The layers may be joined to each other by heating EVA serving as an adhesive.

EXAMPLES

Hereafter, the present invention will be specifically described based on Examples and Comparative Examples.

Example 1

A resin obtained by melt-mixing, at a weight ratio of 20:80, a polymer serving as a fluorine-containing polymer and containing $CF_3(CF_2)_5(CH_2)_2OCOC(CH_3)=CH_2$ and $C_{18}H_{37}OCOCH=CH_2$ at a weight ratio of 50:50 and a polypropylene having an MFR of 800 was extruded using an extruder and melt-blown using a melt-blown nonwoven fabric producing machine to produce a melt-blown nonwoven fabric.

The produced melt-blown nonwoven fabric was subjected to "heat treatment of performing exposure to an atmosphere at 105° C. for 2 minutes" to obtain a pre-collection layer. The obtained pre-collection layer had physical properties listed in the column of the pre-collection layer in Example 1 in Table 2.

A main collection layer that was a porous film was produced by a drawing method using a fluororesin (manufactured by DAIKIN INDUSTRIES. Ltd.). The main collection layer had physical properties listed in the column of the main collection layer in Example 1 in Table 2. The detail of the production of the main collection layer is as follows.

That is, 66.5 wt % (in terms of polymer) of a PTFE aqueous dispersion body (PTFE-A) having an SSG of 2.160, 28.5 wt % (in terms of polymer) of a low-molecular-weight PTFE aqueous dispersion body (PTFE-B) having a melt viscosity of 20000 Pa·s as measured by a flow tester method at 380° C., and 5 wt % (in terms of polymer) of an FEP aqueous dispersion body having a melting point of 215° C. were mixed with each other, and 500 ml of a 1% aqueous aluminum nitrate solution was added thereto as a coagulant and stirred to cause co-coagulation. The resulting powder was strained through a strainer to remove water and then further dried in a hot-air drying furnace at 135° C. for 18 hours to obtain a mixed powder of the above three components.

Subsequently, 33 parts by weight of a hydrocarbon oil ("IP Solvent 2028" manufactured by Idemitsu Kosan Co., Ltd.) serving as a liquid lubricant (extrusion aid) was added to and mixed with 100 parts by weight of the mixed powder at 20° C. Then, the resulting mixture was extruded using a paste extruder to obtain a sheet-shaped formed body. A sheet die including a rectangular extrusion outlet having a length of 2 mm in a short-side direction and a length of 150 mm in a long-side direction was attached to an end portion of the paste extruder. The sheet-shaped formed body was formed into a film using a calendar roll heated to 70° C. to obtain a fluororesin film. This film was passed through a hot-air drying furnace at 200° C. to remove the hydrocarbon oil by evaporation. Thus, a belt-shaped unfired fluororesin film (first raw tape) having an average thickness of 300 μm and an average width of 150 mm was obtained.

In the same manner as the first raw tape, a belt-shaped unfired fluororesin film (second raw tape) having an average thickness of 300 μm and an average width of 150 mm was obtained.

Subsequently, the first raw tape and the second raw tape were stacked on top of each other and drawn in a longitudinal direction (lengthwise direction) at a drawing ratio of 6.5. The drawing temperature was 300° C. Then, the stacked and drawn raw tapes were drawn in a width direction (lateral direction) at a drawing ratio of 13.5 using a tenter that enables continuous clipping and subjected to heat setting. The drawing temperature was 290° C. and the heat-setting temperature was 390° C. Thus, a main collection layer that was a multilayer porous film including two porous films stacked on top of each other was obtained. The collection efficiency of each of the porous films constituting the main collection layer was 99.7%. The collection efficiency of the multilayer porous film was 99.999%.

Furthermore, a thermal-bonded nonwoven fabric formed of polyester and having physical properties listed in the column of the air-permeable supporting member in Example 1 in Table 2 was provided.

The thus-obtained pre-collection layer, main collection layer, and thermal-bonded nonwoven fabric were stacked to form a single-piece structure and thus to obtain an air filter medium in Example 1 in which the pre-collection layer, the main collection layer, and the thermal-bonded nonwoven fabric were arranged in this order from the upstream side of an air flow.

The pre-collection layer, the main collection layer, and the thermal-bonded nonwoven fabric in a stacked state can be easily peeled off and separated from each other.

Example 2

An air filter medium in Example 2 was produced in the same manner as in Example 1, except that the heat treatment of performing exposure to an atmosphere at 105° C. for 2 minutes was not performed in a water-repellent treatment.

Example 3

An air filter medium in Example 3 was produced in the same manner as in Example 1, except that the water-repellent grade and fluorine content of the pre-collection layer were changed.

Example 4

An air filter medium in Example 4 was produced in the same manner as in Example 1, except that the fluorine content, average fiber diameter, basis weight, thickness, pressure loss, and collection efficiency of the pre-collection layer were changed.

Example 5

An air filter medium in Example 5 was produced in the same manner as in Example 1, except that the fluorine content, average fiber diameter, thickness, pressure loss, and collection efficiency of the pre-collection layer were changed.

Comparative Example 1

An air filter medium in Comparative Example 1 was produced in the same manner as in Examples 1 to 3, except that the pre-collection layer was not subjected to water-repellent treatment and did not contain fluorine.

Comparative Example 2

An air filter medium in Comparative Example 2 was produced in the same manner as in Example 4, except that the pre-collection layer was not subjected to water-repellent treatment and did not contain fluorine.

Comparative Example 3

An air filter medium in Comparative Example 3 was produced in the same manner as in Example 5, except that the pre-collection layer was not subjected to water-repellent treatment and did not contain fluorine.
(Water-Repellent Grade)

The water repellency of the pre-collection layer was evaluated on the basis of the following water-repellent grade.

Aqueous isopropyl alcohol (IPA) solutions each having a ratio listed in Table 1 below were prepared and dropped onto the pre-collection layer using a syringe. After 30 seconds, the contact angle was measured, and the lowest water-repellent grade that showed a contact angle of 90° or more was determined.

TABLE 1

| | | Water-repellent grade | | | | | | | | | | |
|---|---|---|---|---|---|---|---|---|---|---|---|---|
| | — | 0 | 1 | 2 | 3 | 4 | 5 | 6 | 7 | 8 | 9 | 10 |
| IPA | Vol % | 0 | 10 | 20 | 30 | 40 | 50 | 60 | 70 | 80 | 90 | 100 |
| Water | Vol % | 100 | 90 | 80 | 70 | 60 | 50 | 40 | 30 | 20 | 10 | 0 |

The water repellency improves as the water-repellent grade increases.
(Fluorine Content)

The fluorine content was measured by ultimate analysis.
(Average Fiber Diameter)

First, a surface of a test specimen was captured using a scanning electron microscope (SEM) at a magnification of 1000 to 5000 times. Two lines orthogonal to each other were drawn on a single captured image, and the width of a fiber image that intersected these lines was measured as a fiber diameter. The number of fibers measured was set to 200 or more. The measured fiber diameters were plotted on a lognormal scale, with the horizontal axis representing a fiber diameter and the vertical axis representing a cumulative frequency. A value at a cumulative frequency of 50% was defined as an average fiber diameter.
(Pressure Loss)

A measurement specimen of the filter medium was set in a filter holder having an internal diameter of 100 mm. The filter holder was pressurized on the entrance side using a compressor, and the flow rate at which air passed was adjusted to 5.3 cm/s using a velocimeter. The pressure loss at this time was measured using a manometer.

(Collection Efficiency of NaCl Particles Having Particle Size of 0.3 μm)

NaCl particles generated with an atomizer in conformity to the NaCl aerosol generating method (pressurized atomizing method) in JIS B9928 Appendix 5 (specification) were classified using an electrostatic classifier (manufactured by TSI Incorporated) into particles having a particle size of 0.3 μm. The charge on the particles as neutralized using americium-241. Then, the flow rate at which the particles passed was adjusted to 5.3 cm/s. The numbers of particles before and after passage through the filter medium serving as a measurement specimen were determined using a particle counter (CNC manufactured by TSI Incorporated), and the collection efficiency was calculated from the following formula.

Collection efficiency (%)=(CO/Cl)×100

CO: Number of 0.3 μm NaCl particles collected by the measurement specimen
Cl: Number of 0.3 μm NaCl particles supplied to the measurement specimen
(Average Pore Size)

The mean flow pore size measured in conformity to ASTM F316-86 was defined as an average pore size (average passage diameter) of the porous film. The actual measurement was performed using a Coulter Porometer (manufactured by Coulter Electronics (UK)).
(Thickness of Porous Film)

The thickness of one layer was determined by stacking five layers to be measured, measuring the total thickness of the five layers using a thickness meter (1D-110MH, manufactured by Mitutoyo Corporation), and dividing the total thickness by 5.
(Thickness of Pre-Collection Layer and Thickness of Air-Permeable Supporting Member)

An ABS Digimatic Indicator (ID-C112CX manufactured by Mitutoyo Corporation) was clamped to a gauge stand, and the thickness of a layer to be measured to which a load of 0.3 N was applied was read.
(Initial Pressure Loss)

The pressure loss of an unused air filter medium was defined as an initial pressure loss.
(Initial Collection Efficiency)

The collection efficiency of an unused air filter medium was defined as an initial collection efficiency.
(Final Collection Efficiency)

The collection efficiency of the air filter medium measured when the pressure loss increased by 250 Pa from the initial pressure loss in the measurement of dust-holding capacity was defined as a final collection efficiency.
(Efficiency Reduction Index)

When the permeability of an unused air filter medium was defined as an initial permeability and the permeability of an air filter medium measured when the pressure loss increased by 250 Pa from the initial pressure loss in the measurement of dust-holding capacity was defined as a final permeability, the value of final permeability/initial permeability was determined as an efficiency reduction index.
(Total Dust-Holding Capacity)

The total dust-holding capacity was evaluated using a pressure loss-increase test in which atmospheric dust was passed through the filter medium. That is, the measurement specimen of the filter medium was set in a filter holder having an internal diameter of 100 mm, and the pressure loss caused when air containing atmospheric dust was continuously passed at a flow velocity of 130 cm/s was measured over time using a differential pressure gauge to determine a dust-holding capacity (g/m²) that is a weight of the atmospheric dust held in the filter medium per unit area of the filter medium when the pressure loss increased by 250 Pa at 5.3 cm/s. The measurement was performed for several days. The measurement was performed in a rainy weather for 10% or more of the measurement duration.

(Dust-Holding Capacity of Pre-Collection Layer)

In the above measurement of the total dust-holding capacity, the pre-collection layer was separated from the air filter medium in which the pressure loss increased by 250 Pa. A dust-holding capacity (g/m²) that is a weight of the atmospheric dust held in the pre-collection layer per unit area of the filter medium was determined.

(Dust-Holding Capacity of Main Collection Layer)

In the above measurement of the total dust-holding capacity, the main collection layer was separated from the air filter medium in which the pressure loss increased by 250 Pa. A dust-holding capacity (g/m²) that is a weight of the atmospheric dust held in the main collection layer per unit area of the filter medium was determined.

Tables 2 and 3 below show the air filter medium (before production of a filter pack or an air filter unit) in each of Examples and Comparative Examples together with the physical properties of each member used to produce the air filter medium.

TABLE 2

| | | Example 1 | Example 2 | Example 3 | Comparative Example 1 |
|---|---|---|---|---|---|
| Pre-collection layer | Water-repellent treatment | Fluorine internal additive + 105° C. heat treatment | Fluorine internal additive | Fluorine internal additive + 105° C. heat treatment | No |
| | Water-repellent grade | 8 | 5 | 3 | 2 |
| | Fluorine content (ppm) | 12600 | 12600 | 2200 | 0 |
| | Average fiber diameter (µm) | 2.5 | 2.5 | 2.5 | 2.5 |
| | Basis weight (g/m²) | 33 | 33 | 33 | 33 |
| | Thickness (mm) | 0.283 | 0.283 | 0.283 | 0.283 |
| | Pressure loss (Pa) | 35 | 35 | 35 | 35 |
| | Collection efficiency (%) (0.3 µm particles) | 55 | 55 | 55 | 55 |
| Main collection layer | Average fiber diameter (µm) | 0.11 | 0.11 | 0.11 | 0.11 |
| | Thickness (mm) | 0.1 | 0.1 | 0.1 | 0.1 |
| | Average pore size (µm) | 2.3 | 2.3 | 2.3 | 2.3 |
| | Pressure loss (Pa) | 140 | 140 | 140 | 140 |
| | Collection efficiency (%) (0.3 µm particles) | 99.999 | 99.999 | 99.999 | 99.999 |
| Air-permeable supporting member | Average fiber diameter (µm) | 28 | 28 | 28 | 28 |
| | Basis weight (g/m²) | 98 | 98 | 98 | 98 |
| | Thickness (mm) | 0.42 | 0.42 | 0.42 | 0.42 |
| | Pressure loss (Pa) | 0 | 0 | 0 | 0 |
| | Collection efficiency (%) (0.3 µm particles) | 0 | 0 | 0 | 0 |
| Whole filter medium | Initial pressure loss (Pa) | 175 | 175 | 175 | 175 |
| | Initial collection efficiency (%) (0.3 µm particles) | 99.9995 | 99.9995 | 99.9995 | 99.9995 |
| | Final collection efficiency (%) (0.3 µm particles) | 99.9991 | 99.999 | 99.992 | 99.99 |
| | Efficiency reduction index (—) | 1.8 | 2.0 | 16 | 20 |
| | Total dust-holding capacity (g/m²) | 23.7 | 23.6 | 23.4 | 23.3 |
| | Dust-holding capacity of pre-collection layer (g/m²) | 22.6 | 22.4 | 21.4 | 21.2 |
| | Dust-holding capacity of main collection layer (g/m²) | 1.1 | 1.2 | 2.0 | 2.1 |

TABLE 3

| | | Example 4 | Comparative Example 2 | Example 5 | Comparative Example 3 |
|---|---|---|---|---|---|
| Pre-collection layer | Water-repellent treatment | Fluorine internal additive + 105° C. heat treatment | No | Fluorine internal additive + 105° C. heat treatment | No |
| | Water-repellent grade | 8 | 2 | 8 | 2 |
| | Fluorine content (ppm) | 12200 | 0 | 12400 | 0 |
| | Average fiber diameter (µm) | 3.1 | 3.1 | 1.6 | 1.6 |
| | Basis weight (g/m²) | 32 | 32 | 33 | 33 |
| | Thickness (mm) | 0.295 | 0.295 | 0.295 | 0.295 |

TABLE 3-continued

| | | Example 4 | Comparative Example 2 | Example 5 | Comparative Example 3 |
|---|---|---|---|---|---|
| | Pressure loss (Pa) | 22 | 22 | 69 | 69 |
| | Collection efficiency (%) (0.3 μm particles) | 33 | 33 | 75 | 75 |
| Main collection layer | Average fiber diameter (μm) | 0.11 | 0.11 | 0.11 | 0.11 |
| | Thickness (mm) | 0.1 | 0.1 | 0.1 | 0.1 |
| | Average pore size (μm) | 2.3 | 2.3 | 2.3 | 2.3 |
| | Pressure loss (Pa) | 140 | 140 | 140 | 140 |
| | Collection efficiency (%) (0.3 μm particles) | 99.999 | 99.999 | 99.999 | 99.999 |
| Air-permeable supporting member | Average fiber diameter (μm) | 28 | 28 | 28 | 28 |
| | Basis weight (g/m²) | 98 | 98 | 98 | 98 |
| | Thickness (mm) | 0.42 | 0.42 | 0.42 | 0.42 |
| | Pressure loss (Pa) | 0 | 0 | 0 | 0 |
| | Collection efficiency (%) (0.3 μm particles) | 0 | 0 | 0 | 0 |
| Whole filter medium | Initial pressure loss (Pa) | 162 | 162 | 209 | 209 |
| | Initial collection efficiency (%) (0.3 μm particles) | 99.9992 | 99.9992 | 99.9997 | 99.9997 |
| | Final collection efficiency (%) (0.3 μm particles) | 99.999 | 99.992 | 99.9994 | 99.994 |
| | Efficiency reduction index (—) | 1.3 | 10 | 2.0 | 20 |
| | Total dust-holding capacity (g/m²) | 36 | 36.3 | 18.9 | 19 |
| | Dust-holding capacity of pre-collection layer (g/m²) | 29.8 | 27.8 | 18.7 | 18 |
| | Dust-holding capacity of main collection layer (g/m²) | 6.2 | 8.5 | 0.2 | 1.0 |

As is clear from the relationship between Examples 1 to 3 and Comparative Example 1, the relationship between Example 4 and Comparative Example 2, and the relationship between Example 5 and Comparative Example 3, the final collection efficiency considerably decreases (the efficiency reduction index is large) at a lower water-repellent grade under the same conditions except for the water-repellent grade of the pre-collection layer. The reason for the reduction in the collection efficiency of the air filter medium 40 including a pre-collection layer having a low water-repellent grade is believed to be as follows. The dust collected in the pre-collection layer is aggregated/grown and receives high wind pressure and thus flows to and reaches the main collection layer on the downstream side. Consequently, the dust sticks so as to cover fibers of the main collection layer, which increases the apparent size of fibers (increase in fiber diameter).

It is also clear from the results that the dust-holding capacity of the main collection layer in the air filter medium measured when the pressure loss increases by 250 Pa in the measurement of dust-holding capacity increases as the water-repellent grade of the pre-collection layer decreases. Thus, it is believed that dust collected in the pre-collection layer is aggregated/grown and receives high wind pressure and thus flows to the main collection layer on the downstream side.

REFERENCE SIGNS LIST

1 air filter medium
2 air filter medium
3 air filter medium
4 air filter medium
5 air filter medium
6 air filter medium
10 pre-collection layer
21 upstream air-permeable supporting member
22 intermediate air-permeable supporting member
23 downstream air-permeable supporting member
30 main collection layer
31 first main collection layer
32 second main collection layer
40 filter pack
50 frame body
60 air filter unit

CITATION LIST

Patent Literature

PTL 1: Japanese Laid-Open Patent Publication No. 2013-094717

The invention claimed is:

1. An air filter medium that collects dust in gas, comprising:
   a main collection layer; and
   a pre-collection layer that has, when air containing NaCl particles having a particle size of 0.3 μm is passed at a flow velocity of 5.3 cm/s, a lower collection efficiency of the particles than the main collection layer, that is disposed on an upstream side of an air flow with respect to the main collection layer, and that has water repellency, wherein
   the pre-collection layer has a contact angle of 90° or more, the contact angle being measured 30 seconds after a 25 vol % aqueous isopropyl alcohol solution is dropped onto the pre-collection layer.

2. The air filter medium according to claim 1, wherein the pre-collection layer has a fluorine content of 1000 ppm or more.

3. The air filter medium according to claim 1, wherein when air containing NaCl particles having a particle size of 0.3 μm is passed through the pre-collection layer at a flow velocity of 5.3 cm/s, the pre-collection layer has a collection efficiency of the particles of 25% or more and 80% or less, and when air containing NaCl particles having a particle size of 0.3 µm is passed through the main collection layer at a flow velocity of 5.3 cm/s, the main collection layer has a collection efficiency of the particles of 75% or more and 99.9999% or less.

4. The air filter medium according to claim 1, wherein
when air containing NaCl particles having a particle size of 0.3 µm is passed through the pre-collection layer at a flow velocity of 5.3 cm/s, the pre-collection layer has a collection efficiency of the particles of 25% or more and 55% or less, and when air containing NaCl particles having a particle size of 0.3 µm is passed through the main collection layer at a flow velocity of 5.3 cm/s, the main collection layer has a collection efficiency of the particles of 75% or more and 99.9999% or less.

5. The air filter medium according to claim 1, wherein the pre-collection layer and the main collection layer are in contact with each other in an air-flow direction.

6. The air filter medium according to claim 1, wherein the pre-collection layer has an average fiber diameter of 1.0 µm or more and 4.0 µm or less.

7. The air filter medium according to claim 1, wherein the main collection layer has an average fiber diameter of 0.05 µm or more and 0.3 µm or less.

8. The air filter medium according to claim 1, wherein the main collection layer includes a porous film mainly containing a fluororesin.

9. The air filter medium according to claim 1, further comprising:
an air-permeable supporting member disposed on a downstream side of the air flow with respect to the main collection layer.

10. A The air filter medium according to claim 2, wherein
when air containing NaCl particles having a particle size of 0.3 µm is passed through the pre-collection layer at a flow velocity of 5.3 cm/s, the pre-collection layer has a collection efficiency of the particles of 25% or more and 80% or less, and when air containing NaCl particles having a particle size of 0.3 µm is passed through the main collection layer at a flow velocity of 5.3 cm/s, the main collection layer has a collection efficiency of the particles of 75% or more and 99.9999% or less.

11. The air filter medium according to claim 2, wherein
when air containing NaCl particles having a particle size of 0.3 µm is passed through the pre-collection layer at a flow velocity of 5.3 cm/s, the pre-collection layer has a collection efficiency of the particles of 25% or more and 55% or less, and when air containing NaCl particles having a particle size of 0.3 µm is passed through the main collection layer at a flow velocity of 5.3 cm/s, the main collection layer has a collection efficiency of the particles of 75% or more and 99.9999% or less.

12. The air filter medium according to claim 3, wherein
when air containing NaCl particles having a particle size of 0.3 µm is passed through the pre-collection layer at a flow velocity of 5.3 cm/s, the pre-collection layer has a collection efficiency of the particles of 25% or more and 55% or less, and when air containing NaCl particles having a particle size of 0.3 µm is passed through the main collection layer at a flow velocity of 5.3 cm/s, the main collection layer has a collection efficiency of the particles of 75% or more and 99.9999% or less.

13. The air filter medium according to claim 2, wherein the pre-collection layer and the main collection layer are in contact with each other in an air-flow direction.

14. The air filter medium according to claim 4, wherein the pre-collection layer and the main collection layer are in contact with each other in an air-flow direction.

15. The air filter medium according to claim 4, wherein the pre-collection layer and the main collection layer are in contact with each other in an air-flow direction.

* * * * *